(12) United States Patent
Sasaki et al.

(10) Patent No.: US 9,754,614 B1
(45) Date of Patent: Sep. 5, 2017

(54) PLASMON GENERATOR INCLUDING A HEAT SINK LAYER INTERPOSED BETWEEN TWO PORTIONS FORMED OF DIFFERENT METAL MATERIALS

(71) Applicants: Yoshitaka Sasaki, Los Gatos, CA (US); Hiroyuki Ito, Milpitas, CA (US); Yukinori Ikegawa, Milpitas, CA (US); Shigeki Tanemura, Milpitas, CA (US); Hideo Mamiya, Milpitas, CA (US); Seiichiro Tomita, Milpitas, CA (US)

(72) Inventors: Yoshitaka Sasaki, Los Gatos, CA (US); Hiroyuki Ito, Milpitas, CA (US); Yukinori Ikegawa, Milpitas, CA (US); Shigeki Tanemura, Milpitas, CA (US); Hideo Mamiya, Milpitas, CA (US); Seiichiro Tomita, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 15/244,556

(22) Filed: Aug. 23, 2016

(51) Int. Cl.
| | |
|---|---|
| *G11B 5/02* | (2006.01) |
| *G11B 11/00* | (2006.01) |
| *G11B 5/39* | (2006.01) |
| *G02B 5/00* | (2006.01) |
| *G02B 6/122* | (2006.01) |
| *G11B 5/48* | (2006.01) |
| *G11B 5/00* | (2006.01) |

(52) U.S. Cl.
CPC ............ *G11B 5/3929* (2013.01); *G02B 5/008* (2013.01); *G02B 6/1226* (2013.01); *G11B 5/4866* (2013.01); *G11B 2005/0021* (2013.01)

(58) Field of Classification Search
CPC ...... G11B 11/10543; G11B 2005/0005; G11B 2005/0021; G11B 5/3145; G11B 5/3903; B82Y 25/00
USPC ............. 360/313, 59, 328; 369/13.13, 13.33, 369/13.32
See application file for complete search history.

(56) References Cited

U.S. PATENT DOCUMENTS

| | | | |
|---|---|---|---|
| 8,711,663 B1 | 4/2014 | Sasaki et al. | |
| 8,848,494 B2 | 9/2014 | Sasaki et al. | |
| 8,861,138 B2 | 10/2014 | Sasaki et al. | |
| 8,873,354 B2 * | 10/2014 | Jin ........................ | G02B 6/105 369/13.13 |

* cited by examiner

*Primary Examiner* — Nabil Hindi
(74) *Attorney, Agent, or Firm* — Oliff PLC

(57) ABSTRACT

A plasmon generator includes: a first portion formed of a first metal material and including a front end face configured to generate near-field light; a second portion formed of a second metal material and located at a distance from the front end face; and a heat sink layer formed of a third metal material, located at a distance from the front end face and interposed between the first portion and the second portion. The second metal material is lower in Vickers hardness and higher in thermal conductivity than the first metal material. The third metal material has a thermal conductivity higher than that of each of the first and second metal materials, and has a Vickers hardness lower than that of the first metal material and higher than that of the second metal material.

29 Claims, 23 Drawing Sheets

PLASMON GENERATOR INCLUDING A HEAT SINK LAYER INTERPOSED BETWEEN TWO PORTIONS FORMED OF DIFFERENT METAL MATERIALS

BACKGROUND OF THE INVENTION

1. Field of the Invention

The present invention relates to a plasmon generator for use in thermally-assisted magnetic recording to write data on a recording medium with the coercivity thereof lowered by irradiating the recording medium with near-field light, and to a thermally-assisted magnetic recording head including the plasmon generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium.

To increase the recording density of a magnetic recording device, it is effective to make the magnetic fine particles of the recording medium smaller. Making the magnetic fine particles smaller, however, disadvantageously reduces the thermal stability of magnetization of the magnetic fine particles. To resolve this problem, it is effective to increase the anisotropic energy of the magnetic fine particles. However, increasing the anisotropic energy of the magnetic fine particles leads to an increase in coercivity of the recording medium, thus making it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Pat. Nos. 8,711,663 B1, 8,848,494 B2 and 8,861,138 B2 each disclose a thermally-assisted magnetic recording head including a main pole, a waveguide and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that is generated at the surface of the core from the light propagating through the core, and to generate near-field light from the excited surface plasmons at the end face of the plasmon generator.

To achieve higher recording density, it is necessary to make the track width smaller by reducing at least one of the width of the end face of the plasmon generator in the medium facing surface and the width of the end face of the main pole in the medium facing surface.

In a thermally-assisted magnetic recording head, heat generated by the plasmon generator causes the plasmon generator to get hot. This results in the problem of deformation or breakage of the plasmon generator, thus shortening the life of the thermally-assisted magnetic recording head. In particular, the smaller the width of the end face of the plasmon generator in the medium facing surface, the more noticeable the aforementioned problem becomes.

One of solutions to the aforementioned problem is to construct the plasmon generator to include a first metal portion and a second metal portion that are formed of mutually different metal materials, as disclosed in U.S. Pat. Nos. 8,711,663 B1, 8,848,494 B2 and 8,861,138 B2. The first metal portion has an end face located in the medium facing surface. The second metal portion has a front end that is closest to the medium facing surface and located at a distance from the medium facing surface. The second metal portion further has a plasmon exciting section to excite surface plasmons thereon. The surface plasmons excited on the plasmon exciting section propagate to the end face of the first metal portion located in the medium facing surface, and near-field light is generated from those excited surface plasmons at the end face of the first metal portion.

A metal suitable for excitation and propagation of surface plasmons, that is, a metal having high electrical conductivity such as Au or Ag is selected as the metal material to form the second metal portion. As the metal material to form the first metal portion, selected is one having higher hardness than the metal material used for the second metal portion. This serves to prevent the first metal portion from being deformed or broken.

However, the plasmon generator including the aforementioned first and second metal portions has a problem in that the heat generated at the first metal portion is transferred to the second metal portion to cause the second metal portion to get hot, and can thus deform the second metal portion such that its front end gets farther from the medium facing surface.

OBJECT AND SUMMARY OF THE INVENTION

It is an object of the present invention to provide a plasmon generator of high reliability, and a thermally-assisted magnetic recording head including the plasmon generator.

A plasmon generator of a first aspect of the present invention has a front end face configured to generate near-field light from a surface plasmon. The plasmon generator includes a first portion, a second portion, and a first heat sink layer interposed between the first portion and the second portion. The first portion is formed of a first metal material and includes the front end face. The second portion is formed of a second metal material and located at a distance from the front end face. The first heat sink layer is formed of a third metal material and located at a distance from the front end face.

The second metal material is lower in Vickers hardness and higher in thermal conductivity than the first metal material. The third metal material has a thermal conductivity higher than that of each of the first and second metal materials, and has a Vickers hardness lower than that of the first metal material and higher than that of the second metal material.

In the plasmon generator of the first aspect of the present invention, the second portion may include a plasmon exciting section configured to excite a surface plasmon thereon.

In the plasmon generator of the first aspect of the present invention, the front end face may have a first edge and a second edge opposite to each other in a first direction. At least part of the first heat sink layer may be located between a first imaginary plane and a second imaginary plane. The first imaginary plane includes the first edge and is perpendicular to the first direction. The second imaginary plane includes the second edge and is perpendicular to the first direction.

In the plasmon generator of the first aspect of the present invention, the first metal material may contain one of Rh, Ir, Ru and Pt. In this case, the first metal material may further contain one of Au, Cu, Ag and Al. The second metal material may be Au. The third metal material may be Cu.

The plasmon generator of the first aspect of the present invention may further include a second heat sink layer formed of a fourth metal material, located at a distance from the front end face and being in contact with the first portion. The fourth metal material is lower in Vickers hardness and higher in thermal conductivity than the first metal material. In this case, the front end face may have a first edge and a second edge opposite to each other in the first direction. At least part of the first heat sink layer and at least part of the second heat sink layer may be located between the first imaginary plane and the second imaginary plane mentioned above. The fourth metal material may be Cu.

In the plasmon generator of the first aspect of the present invention, the second portion may have a contact surface in contact with the first heat sink layer. The first heat sink layer may include a thickness-changing portion. In the thickness-changing portion, the thickness in a direction perpendicular to the contact surface decreases with decreasing distance to the front end face.

A thermally-assisted magnetic recording head of the first aspect of the present invention includes a medium facing surface configured to face a recording medium, a main pole for producing a write magnetic field for use to write data on the recording medium, a waveguide, and the plasmon generator of the first aspect of the present invention. The waveguide includes a core and a cladding, the core allowing light to propagate therethrough, the cladding being provided around the core. The front end face of the plasmon generator is located in the medium facing surface.

In the thermally-assisted magnetic recording head of the first aspect of the present invention, the core may have an evanescent light generating surface configured to generate evanescent light from the light propagating through the core. The second portion of the plasmon generator may include a plasmon exciting section configured to excite a surface plasmon thereon. In this case, the plasmon generator is configured so that a surface plasmon is excited on the plasmon exciting section through coupling with the evanescent light, and then the surface plasmon propagates to the front end face.

The thermally-assisted magnetic recording head of the first aspect of the present invention may further include a heat sink interposed between the plasmon generator and the main pole. In this case, the heat sink may have an inclined surface facing toward the medium facing surface. The inclined surface has a first end closest to the plasmon generator, and a second end farthest from the plasmon generator. The inclined surface is inclined with respect to the medium facing surface such that the second end is at a greater distance from the medium facing surface than is the first end. The main pole may include a portion located between the inclined surface and the medium facing surface.

A plasmon generator of a second aspect of the present invention has a front end face configured to generate near-field light from a surface plasmon. The plasmon generator includes a first portion and a second portion. The first portion is formed of a first metal material and includes the front end face. The second portion is formed of a second metal material and located at a distance from the front end face.

In the plasmon generator of the second aspect of the present invention, the second metal material is lower in Vickers hardness and higher in thermal conductivity than the first metal material. The first metal material contains one of Rh, Ir, Ru and Pt. The first metal material may further contain one of Au, Cu, Ag and Al. The second metal material is Cu.

The plasmon generator of the second aspect of the present invention may further include a first heat sink layer formed of Cu, located at a distance from the front end face and interposed between the first portion and the second portion. The front end face may have a first edge and a second edge opposite to each other in a first direction. At least part of the first heat sink layer may be located between a first imaginary plane and a second imaginary plane. The first imaginary plane includes the first edge and is perpendicular to the first direction. The second imaginary plane includes the second edge and is perpendicular to the first direction.

The plasmon generator of the second aspect of the present invention may further include a second heat sink layer formed of Cu, located at a distance from the front end face and being in contact with the first portion. At least part of the first heat sink layer and at least part of the second heat sink layer may be located between the first imaginary plane and the second imaginary plane mentioned above.

A thermally-assisted magnetic recording head of the second aspect of the present invention includes a medium facing surface configured to face a recording medium, a main pole for producing a write magnetic field for use to write data on the recording medium, a waveguide, and the plasmon generator of the second aspect of the present invention. The waveguide includes a core and a cladding, the core allowing light to propagate therethrough, the cladding being provided around the core. The front end face of the plasmon generator is located in the medium facing surface.

In the thermally-assisted magnetic recording head of the second aspect of the present invention, the core may have an evanescent light generating surface configured to generate evanescent light from the light propagating through the core. The second portion of the plasmon generator may include a plasmon exciting section configured to excite a surface plasmon thereon. In this case, the plasmon generator is configured so that a surface plasmon is excited on the plasmon exciting section through coupling with the evanescent light, and then the surface plasmon propagates to the front end face.

A thermally-assisted magnetic recording head of a third aspect of the present invention includes a medium facing surface configured to face a recording medium, a main pole, a waveguide, a plasmon generator, and a heat sink. The main pole produces a write magnetic field for use to write data on the recording medium. The waveguide includes a core and a cladding, the core allowing light to propagate therethrough, the cladding being provided around the core. The plasmon generator has a front end face configured to generate near-field light from a surface plasmon. The heat sink is interposed between the plasmon generator and the main pole. The front end face of the plasmon generator is located in the medium facing surface.

In the thermally-assisted magnetic recording head of the third aspect of the present invention, the plasmon generator includes a first portion and a heat sink layer. The first portion is formed of a first metal material and includes the front end face. The heat sink layer is interposed between the first portion and the heat sink. The heat sink is formed of a metal material that is lower in Vickers hardness and higher in thermal conductivity than the first metal material. The heat sink layer is formed of a metal material that has a thermal conductivity higher than that of each of the first metal material and the metal material used to form the heat sink, and a Vickers hardness lower than that of the first metal material and higher than that of the metal material used to form the heat sink.

In the thermally-assisted magnetic recording head of the third aspect of the present invention, the first metal material may contain one of Rh, Ir, Ru and Pt. The first metal material may further contain one of Au, Cu, Ag and Al. The metal material used to form the heat sink may be Au. The metal material used to form the heat sink layer may be Cu.

A plasmon generator of a fourth aspect of the present invention has a front end face configured to generate near-field light from a surface plasmon. The plasmon generator includes a main part and a heat sink layer. The main part includes the front end face. The heat sink layer is in contact with the main part. The main part includes a first portion formed of a first metal material and including the front end face. The heat sink layer is formed of a second metal material and located at a distance from the front end face.

The main part has a first rear end farthest from the front end face. The heat sink layer has a second rear end farthest from the front end face. The second rear end is located at a greater distance from the front end face than is the first rear end.

In the plasmon generator of the fourth aspect of the present invention, the second metal material is lower in Vickers hardness and higher in thermal conductivity than the first metal material. The first metal material contains one of Rh, Ir, Ru and Pt. The first metal material may further contain one of Au, Cu, Ag and Al. The second metal material is Cu.

In the plasmon generator of the fourth aspect of the present invention, the front end face may have a first edge and a second edge opposite to each other in a first direction. At least part of the heat sink layer may be located between a first imaginary plane and a second imaginary plane. The first imaginary plane includes the first edge and is perpendicular to the first direction. The second imaginary plane includes the second edge and is perpendicular to the first direction.

A thermally-assisted magnetic recording head of the fourth aspect of the present invention includes a medium facing surface configured to face a recording medium, a main pole for producing a write magnetic field for use to write data on the recording medium, a waveguide, and the plasmon generator of the fourth aspect of the present invention. The waveguide includes a core and a cladding, the core allowing light to propagate therethrough, the cladding being provided around the core. The front end face of the plasmon generator is located in the medium facing surface.

According to the plasmon generator and thermally-assisted magnetic recording head of the first aspect of the present invention, the plasmon generator and thermally-assisted magnetic recording head of the second aspect of the present invention, the thermally-assisted magnetic recording head of the third aspect of the present invention, and the plasmon generator and thermally-assisted magnetic recording head of the fourth aspect of the present invention, the plasmon generators are less susceptible to deformation and less likely to rise in temperature, and as a result, the plasmon generators provide improved reliability.

Other and further objects, features and advantages of the present invention will appear more fully from the following description.

DETAILED DESCRIPTION OF THE PREFERRED EMBODIMENTS

First Embodiment

Figure 1:
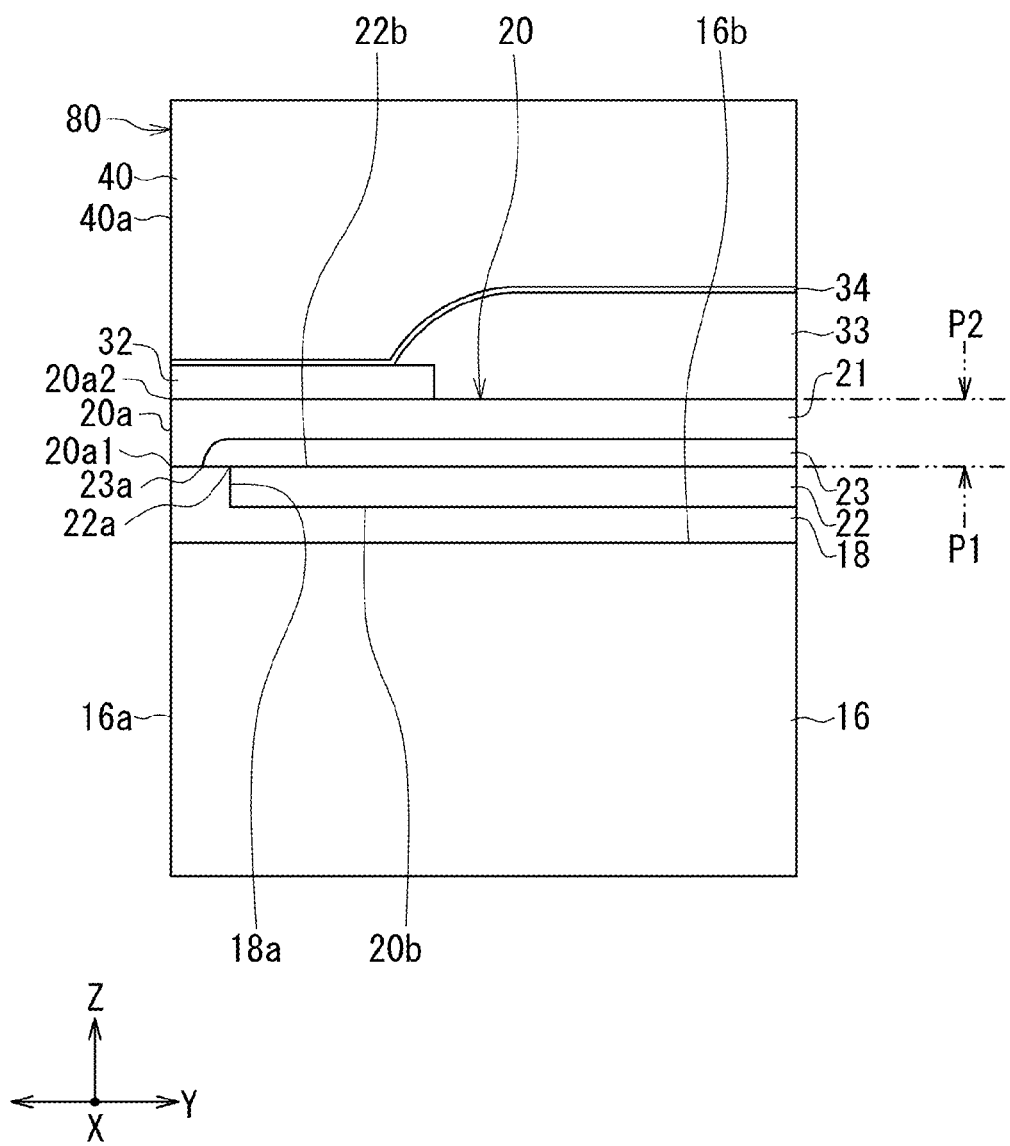
FIG. 1 is a cross-sectional view showing the main part of a thermally-assisted magnetic recording head according to a first embodiment of the invention.
Figure 2:
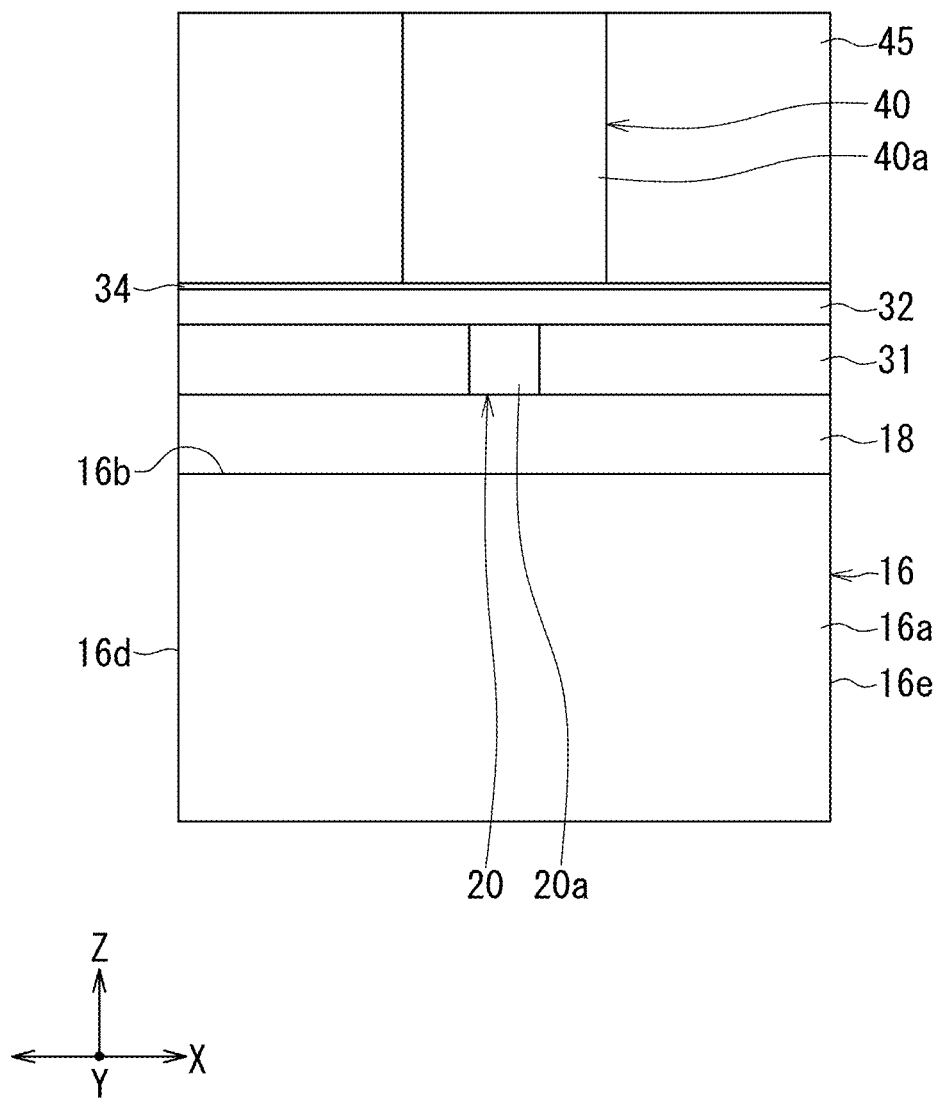
FIG. 2 is a front view showing the main part of the thermally-assisted magnetic recording head according to the first embodiment of the invention.
Figure 3:
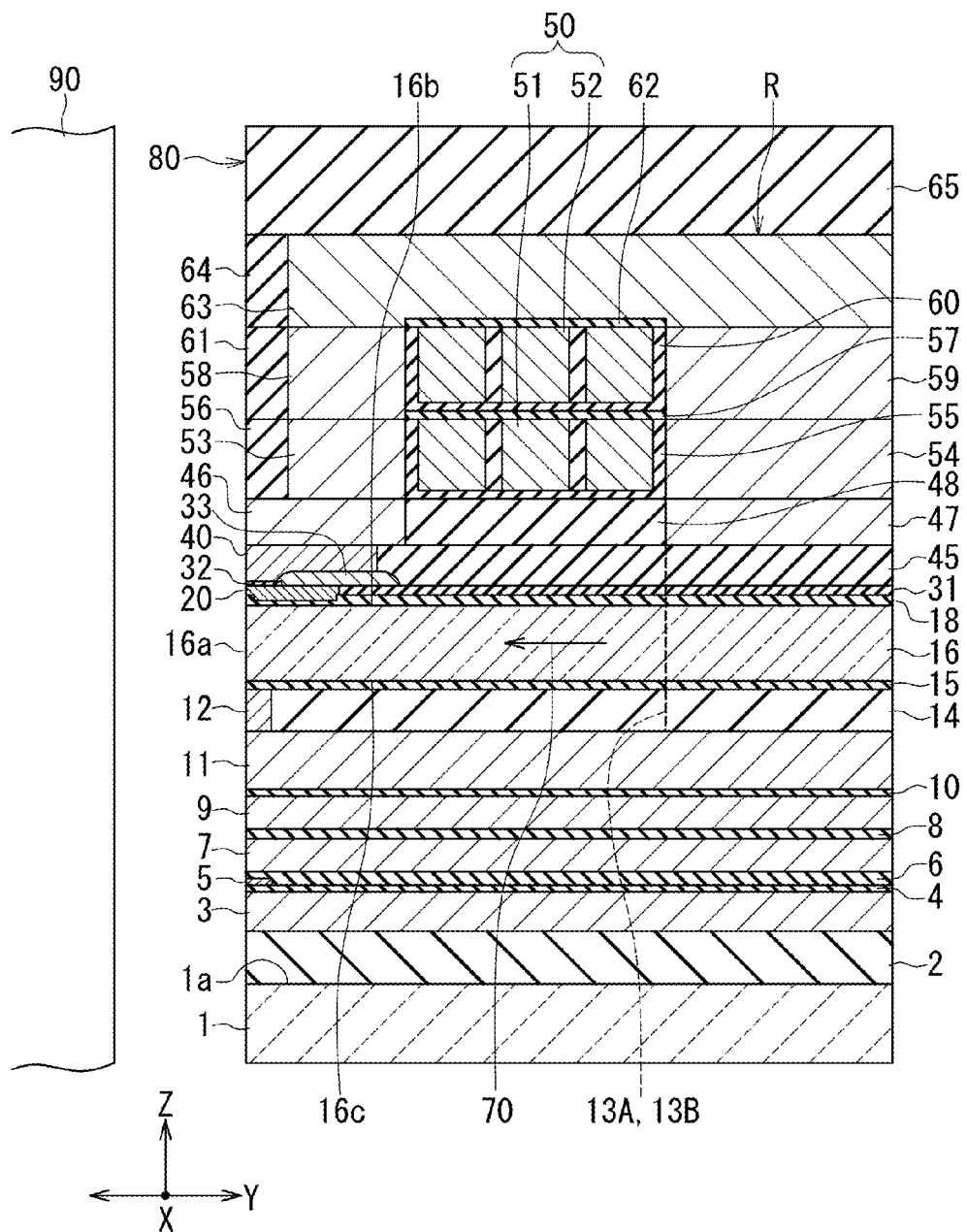
FIG. 3 is a cross-sectional view showing the configuration of the thermally-assisted magnetic recording head according to the first embodiment of the invention.
Figure 4:
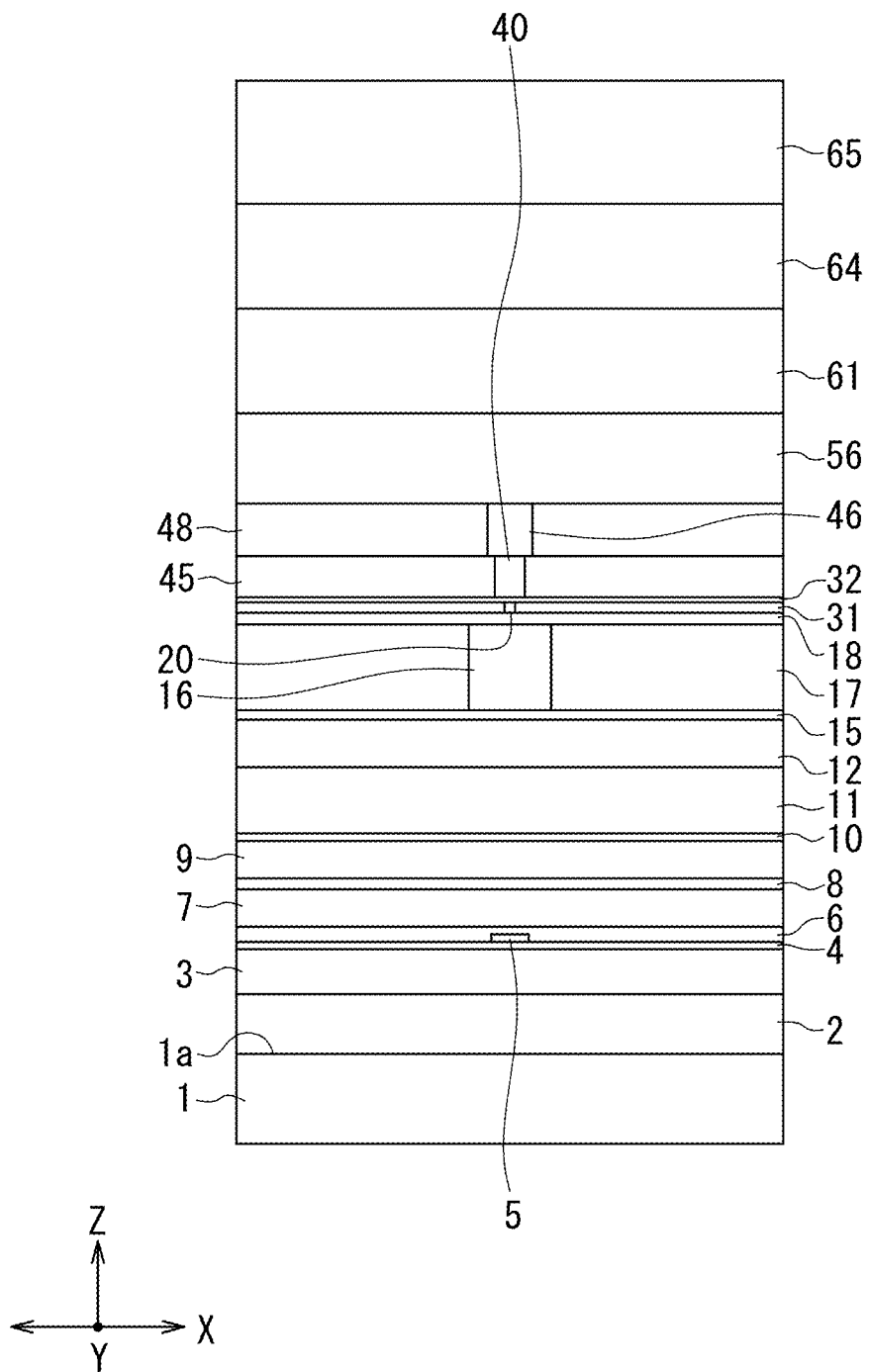
FIG. 4 is a front view showing the medium facing surface of the thermally-assisted magnetic recording head according to the first embodiment of the invention.

Preferred embodiments of the present invention will now be described in detail with reference to the drawings. First, reference is made to FIG. 1 to FIG. 4 to describe the configuration of a thermally-assisted magnetic recording head according to a first embodiment of the invention. FIG. 1 is a cross-sectional view showing the main part of the thermally-assisted magnetic recording head. FIG. 2 is a front view showing the main part of the thermally-assisted magnetic recording head. FIG. 3 is a cross-sectional view showing the configuration of the thermally-assisted magnetic recording head. FIG. 4 is a front view showing the medium facing surface of the thermally-assisted magnetic recording head.

The thermally assisted magnetic recording head according to the present embodiment is intended for use in perpendicular magnetic recording, and is incorporated in a slider configured to fly over the surface of a rotating recording medium 90. The slider has a medium facing surface 80 configured to face the recording medium 90. When the recording medium 90 rotates, an airflow passing between the recording medium 90 and the slider causes a lift to be exerted on the slider. The lift causes the slider to fly over the surface of the recording medium 90.

As shown in FIG. 3, the thermally-assisted magnetic recording head has the medium facing surface 80. Here, we define X direction, Y direction, and Z direction as follows. The X direction is a direction across the tracks of the recording medium 90, that is, the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 3 and FIG. 4, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a write head unit disposed on the nonmagnetic layer 10. The middle shield layer 9 has the function of shielding the MR element 5 from magnetic fields generated in the write head unit. The insulating layer 8 and the nonmagnetic layer 10 are formed of alumina, for example.

The write head unit includes a coil 50 and a main pole 40. The coil 50 produces a magnetic field corresponding to data to be written on the recording medium 90. As shown in FIG. 1 and FIG. 2, the main pole 40 has a front end face 40a located in the medium facing surface 80. The main pole 40 is configured to pass a magnetic flux corresponding to the magnetic field produced by the coil 50, and to produce from the front end face 40a a write magnetic field for use to write data on the recording medium 90 by means of a perpendicular magnetic recording system. The coil 50 is formed of a conductive material such as copper.

The write head unit further includes a return path section R formed of a magnetic material. The return path section R includes a return pole layer 11, a shield layer 12, two coupling sections 13A and 13B, coupling layers 46, 47, 53, 54, 58 and 59, and a yoke layer 63. The return pole layer 11 lies on the nonmagnetic layer 10. The return pole layer 11 has an end face located in the medium facing surface 80. The write head unit further includes a non-illustrated insulating layer provided around the return pole layer 11. The non-illustrated insulating layer is formed of alumina, for example.

The shield layer 12 is located on a first portion of the top surface of the return pole layer 11, the first portion being near the medium facing surface 80. The shield layer 12 has an end face located in the medium facing surface 80. The two coupling sections 13A and 13B are located on two second portions of the top surface of the return pole layer 11, the two second portions being located away from the medium facing surface 80. Each of the coupling sections 13A and 13B includes a first layer lying on the return pole layer 11, and a second and a third layer stacked in this order on the first layer. The first layer of the coupling section 13A and the first layer of the coupling section 13B are arranged to be adjacent in the track width direction (the X direction).

The write head unit further includes an insulating layer 14 lying on the non-illustrated insulating layer and a portion of the top surface of the return pole layer 11 other than the first and second portions. The first layers of the coupling sections 13A and 13B are embedded in the insulating layer 14. The insulating layer 14 is formed of alumina, for example.

The write head unit further includes a waveguide including a core 16 and a cladding. The core 16 allows light to propagate therethrough. The cladding is provided around the core 16. The core 16 has a front end face 16a facing toward the medium facing surface 80, an evanescent light generating surface 16b which is a top surface, a bottom surface 16c, and two side surfaces 16d and 16e. The front end face 16a may be located in the medium facing surface 80 or at a distance from the medium facing surface 80. FIG. 1 to FIG. 4 show an example in which the front end face 16a is located in the medium facing surface 80.

The cladding includes cladding layers 15, 17 and 18. The cladding layer 15 lies on the shield layer 12 and the insulating layer 14. The core 16 lies on the cladding layer 15. The cladding layer 17 lies on the cladding layer 15 and surrounds the core 16. The cladding layer 18 is disposed over the evanescent light generating surface 16b of the core 16 and the top surface of the cladding layer 17.

The core 16 is formed of a dielectric material that transmits laser light to be used for generating near-field light. The laser light emitted from a non-illustrated laser diode enters the core 16 and propagates through the core 16. The cladding layers 15, 17 and 18 are each formed of a dielectric material that has a refractive index lower than that of the core 16. For example, the core 16 may be formed of tantalum oxide such as $Ta_2O_5$ or silicon oxynitride (SiON), whereas the cladding layers 15, 17 and 18 may be formed of silicon oxide ($SiO_2$) or alumina.

The second layers of the coupling sections 13A and 13B are embedded in the cladding layers 15 and 17. The second layer of the coupling section 13A and the second layer of the coupling section 13B are located on opposite sides of the core 16 in the track width direction (the X direction) and spaced from the core 16.

The write head unit further includes a plasmon generator 20 lying above the core 16 in the vicinity of the medium facing surface 80. The cladding layer 18 includes a receiving section 18a for receiving a part of the plasmon generator 20. The plasmon generator 20 is configured to excite surface plasmons on the principle to be described later. The plasmon generator 20 will be described in detail later.

The write head unit further includes a dielectric layer 31 and an insulating film 32. The dielectric layer 31 lies on the cladding layer 18 and surrounds the plasmon generator 20. The insulating film 32 is located near the medium facing surface 80 and lies astride part of the plasmon generator 20 and part of the dielectric layer 31. The dielectric layer 31 is formed of the same material as the cladding layers 15, 17 and 18, for example. The insulating film 32 is formed of silicon oxide or alumina, for example.

The write head unit further includes a heat sink 33 located at a distance from the medium facing surface 80 and lying on the plasmon generator 20 and the dielectric layer 31. The heat sink 33 is interposed between the plasmon generator 20 and the main pole 40. The heat sink 33 is formed of one of Au, Cu, Ag and Al, for example.

As shown in FIG. 3, the plasmon generator 20 and the heat sink 33 have their respective rear ends farthest from the medium facing surface 80. The rear end of the heat sink 33 is located at a greater distance from the medium facing surface 80 than is the rear end of the plasmon generator 20.

The write head unit further includes a separating film 34 lying on the insulating film 32 and the heat sink 33. FIG. 3 and FIG. 4 omit the illustration of the separating film 34. The main pole 40 lies on the separating film 34. The separating film 34 has the function of preventing the material of the heat sink 33 from diffusing into the main pole 40. The separating film 34 is formed of Ru, Cr, Zr, Ti or Ta, for example.

The main pole 40 is located on the front side in the direction of travel of the recording medium 90 relative to the core 16. The plasmon generator 20 is located between the core 16 and the main pole 40. The write head unit further includes a dielectric layer 45 provided around the main pole 40 and the heat sink 33. The dielectric layer 45 is formed of the same material as the cladding layers 15, 17 and 18, for example.

The third layers of the coupling sections 13A and 13B are embedded in the cladding layer 18 and the dielectric layers 31 and 45. The coupling layer 47 lies on the third layers of the coupling sections 13A and 13B and the dielectric layer 45.

The coupling layer 46 lies on the main pole 40 and the dielectric layer 45. The coupling layer 46 has an end face located in the medium facing surface 80.

The write head unit further includes a dielectric layer 48 provided around the coupling layers 46 and 47. The dielectric layer 48 is formed of the same material as the cladding layers 15, 17 and 18, for example.

The coupling layer 53 lies on the coupling layer 46. The coupling layer 53 has an end face facing toward the medium facing surface 80 and located at a distance from the medium facing surface 80. The coupling layer 54 lies on the coupling layer 47.

The coil 50 includes a first layer 51 and a second layer 52. The first layer 51 and the second layer 52 are connected in series, for example. The first layer 51 is wound around the coupling layer 54. The write head unit further includes an insulating film 55, an insulating layer 56 and an insulating layer 57. The insulating film 55 is interposed between the first layer 51 and each of the coupling layers 53 and 54 and the dielectric layer 48. The insulating layer 56 lies around the first layer 51 and the coupling layer 53 and in the space between adjacent turns of the first layer 51. The insulating layer 57 lies on the first layer 51, the insulating film 55 and the insulating layer 56. The insulating film 55 and the insulating layers 56 and 57 are formed of alumina, for example.

The coupling layer 58 lies on the coupling layer 53. The coupling layer 58 has an end face facing toward the medium facing surface 80 and located at a distance from the medium facing surface 80. The coupling layer 59 lies on the coupling layer 54.

The second layer 52 of the coil 50 lies above the first layer 51. The second layer 52 is wound around the coupling layer 59. The write head unit further includes an insulating film 60, an insulating layer 61 and an insulating layer 62. The insulating film 60 is interposed between the second layer 52 and each of the coupling layers 58 and 59 and the insulating layer 57. The insulating layer 61 lies around the second layer 52 and the coupling layer 58 and in the space between adjacent turns of the second layer 52. The insulating layer 62 lies on the second layer 52, the insulating film 60 and the insulating layer 61. The insulating film 60 and the insulating layers 61 and 62 are formed of alumina, for example.

The yoke layer 63 lies on the coupling layers 58 and 59 and the insulating layer 62. The yoke layer 63 has an end face facing toward the medium facing surface 80 and located at a distance from the medium facing surface 80. The write head unit further includes an insulating layer 64 provided around the yoke layer 63. The insulating layer 64 is formed of alumina, for example.

As shown in FIG. 3 and FIG. 4, the thermally-assisted magnetic recording head further includes a protective layer 65 disposed to cover the write head unit. The protective layer 65 is formed of alumina, for example.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the coil 50, the main pole 40, the waveguide, and the plasmon generator 20. The waveguide includes the core 16 and the cladding. The cladding includes the cladding layers 15, 17 and 18.

The write head unit further includes the return path section R. The return path section R connects the main pole 40 to the shield layer 12, and passes a magnetic flux corresponding to the magnetic field produced by the coil 50. The shield layer 12 and the return path section R have the function of allowing a magnetic flux that has been produced from the front end face 40a of the main pole 40 and has magnetized a portion of the recording medium 90 to flow back to the main pole 40.

The plasmon generator 20 will now be described with reference to FIG. 1. The plasmon generator 20 has a front end face 20a configured to generate near-field light from surface plasmons. The front end face 20a is located in the medium facing surface 80. The front end face 20a lies between the front end face 40a of the main pole 40 and the front end face 16a of the core 16. The front end face 20a generates near-field light on the principle to be described later.

The plasmon generator 20 includes a first portion 21, a second portion 22, and a heat sink layer 23 interposed between the first portion 21 and the second portion 22. The heat sink layer 23 corresponds to the first heat sink layer of the plasmon generator of the first aspect of the present invention.

The first portion 21 is formed of a first metal material and includes the front end face 20a. The second portion 22 is formed of a second metal material and located at a distance from the front end face 20a. In the present embodiment, the second portion 22 is received in the receiving section 18a of the cladding layer 18. The heat sink layer 23 is formed of a third metal material, located at a distance from the front end face 20a and interposed between the first portion 21 and the second portion 22. The second portion 22 has a front end 22a closest to the medium facing surface 80, and a contact surface 22b in contact with the heat sink layer 23. In the present embodiment, the top surface of the cladding layer 18 and the contact surface 22b of the second portion 22 are coplanar. The heat sink layer 23 lies on the cladding layer 18 and the second portion 22. The heat sink layer 23 has a front end 23a closest to the medium facing surface 80. In the present embodiment, the front end 23a of the heat sink layer 23 is at a smaller distance from the medium facing surface 80 than is the front end 22a of the second portion 22.

The distance from the medium facing surface 80 to the front end 22a is, for example, 10 to 50 nm, and preferably falls within the range of 20 to 40 nm. The distance from the medium facing surface 80 to the front end 23a is, for example, 10 to 30 nm, and preferably falls within the range of 10 to 20 nm.

The second metal material is lower in Vickers hardness and higher in thermal conductivity than the first metal material. In the present embodiment, the second metal material is higher in electrical conductivity than the first metal material. The third metal material has a thermal conductivity higher than that of each of the first and second metal materials, and has a Vickers hardness lower than that of the first metal material and higher than that of the second metal material. The first metal material contains one of Rh, Ir, Ru and Pt, for example. The second metal material is Au, for example. The third metal material is Cu, for example.

The front end face 20a has a first edge 20a1 and a second edge 20a2 opposite to each other in the Z direction. The Z direction corresponds to the first direction in the present invention. Now, we define a first imaginary plane P1 and a second imaginary plane P2 as follows. The first imaginary plane P1 is a plane including the first edge 20a1 and perpendicular to the Z direction (the first direction). The second imaginary plane P2 is a plane including the second edge 20a2 and perpendicular to the Z direction (the first direction). At least part of the heat sink layer 23 may be located between the first imaginary plane P1 and the second imaginary plane P2. In the present embodiment, in particular, the entirety of the heat sink layer 23 is located between the first imaginary plane P1 and the second imaginary plane P2.

The distance between the first edge 20a1 and the second edge 20a2 is, for example, 30 to 100 nm, and preferably falls within the range of 40 to 60 nm. The second portion 22 has a thickness of, for example, 20 to 60 nm in the Z direction, the thickness preferably falling within the range of 30 to 40 nm. In the present embodiment, the heat sink layer 23 has a thickness of, for example, 10 to 100 nm in the Z direction, the thickness preferably falling within the range of 20 to 30 nm. The greater the thickness of the heat sink layer 23 in the Z direction, the higher the function of the heat sink layer 23 to be described later. The front end face 20a has a width of, for example, 5 to 40 nm in the track width direction (the X direction).

The second portion 22 includes a plasmon exciting section 20b configured to excite surface plasmons thereon. The plasmon exciting section 20b is located at a predetermined distance from the evanescent light generating surface 16b of the core 16 and faces the evanescent light generating surface 16b. The cladding layer 18 is interposed between the evanescent light generating surface 16b and the plasmon exciting section 20b.

Figure 5:
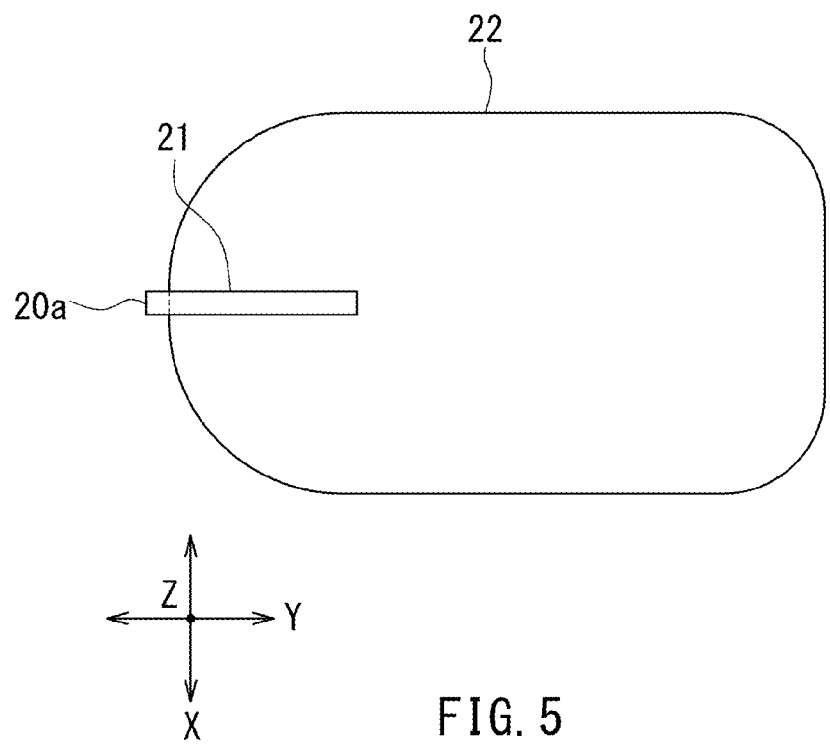
FIG. 5 is a plan view showing a first example of the shape of a first portion and a second portion of a plasmon generator according to the first embodiment of the invention.
Figure 6:
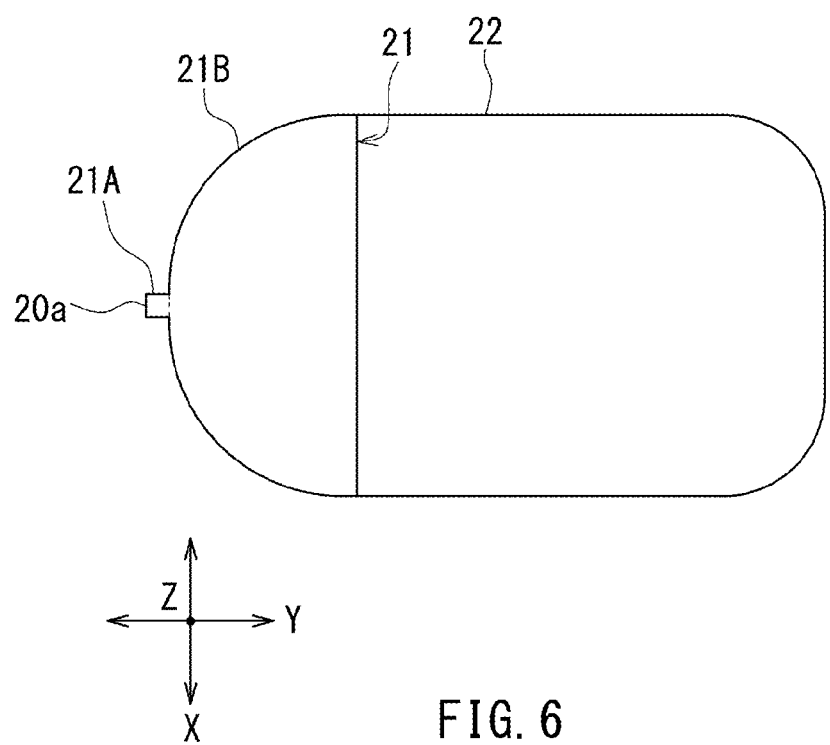
FIG. 6 is a plan view showing a second example of the shape of the first portion and the second portion of the plasmon generator according to the first embodiment of the invention.
Figure 7:
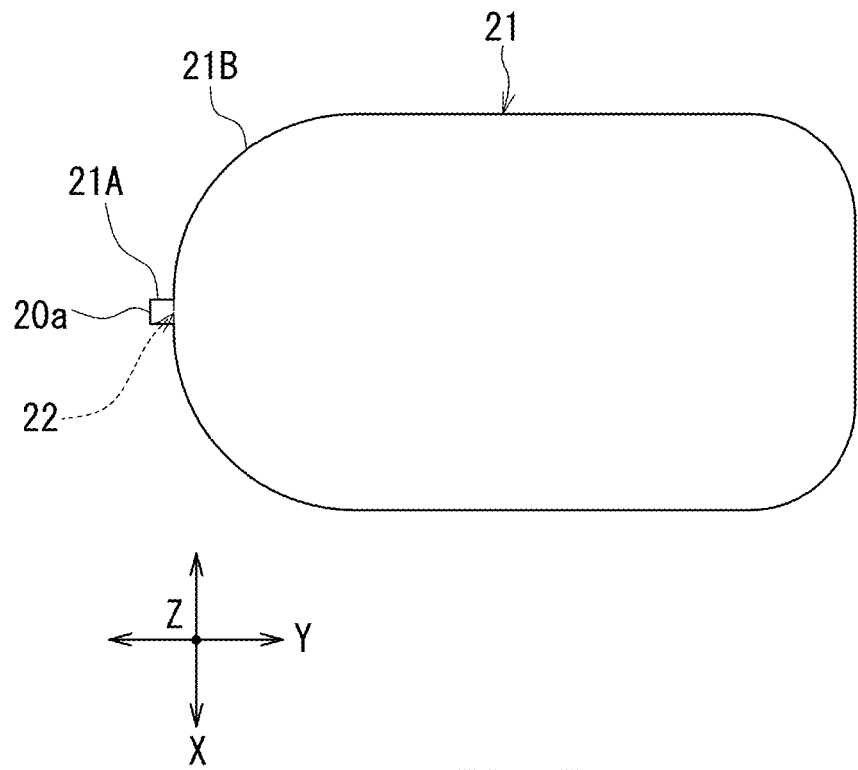
FIG. 7 is a plan view showing a third example of the shape of the first portion and the second portion of the plasmon generator according to the first embodiment of the invention.

Reference is now made to FIG. 5 to FIG. 7 to describe a first to a third example of the planar shape (the shape as viewed from above) of the first portion 21 and the second portion 22. FIG. 5 is a plan view showing the first example of the planar shape of the first portion 21 and the second portion 22. In the first example, the width of the first portion 21 in the track width direction (the X direction) is constant regardless of distance from the front end face 20a (the medium facing surface 80). The width of the first portion 21 in the track width direction (the X direction) is smaller than the maximum width of the second portion 22 in the track width direction (the X direction).

FIG. 6 is a plan view showing the second example of the planar shape of the first portion 21 and the second portion 22. In the second example, the first portion 21 includes a narrow portion 21A and a wide portion 21B. The wide portion 21B is located at a distance from the medium facing surface 80. The narrow portion 21A is located between the wide portion 21B and the medium facing surface 80. The narrow portion 21A includes the front end face 20a. The width of the narrow portion 21A in the track width direction (the X direction) is constant regardless of distance from the front end face 20a (the medium facing surface 80). The wide portion 21B is greater than the narrow portion 21A in width in the track width direction (the X direction). Further, in the second example, the wide portion 21B is smaller than the second portion 22 in planar shape. Part of the second portion 22 has the same planar shape as the wide portion 21B.

FIG. 7 is a plan view showing the third example of the planar shape of the first portion 21 and the second portion 22. In the third example, the first portion 21 includes the narrow portion 21A and the wide portion 21B as in the second example. In the third example, however, the wide portion 21B has the same planar shape as the second portion 22.

Now, the principle of generation of near-field light in the present embodiment and the principle of thermally-assisted magnetic recording using near-field light will be described in detail. Laser light emitted from a laser diode (not illustrated) enters the core 16. As shown in FIG. 3, the laser light 70 propagates through the core 16 toward the medium facing surface 80, and reaches the vicinity of the plasmon generator 20. The evanescent light generating surface 16b of the core 16 generates evanescent light from the laser light 70 propagating through the core 16. More specifically, the laser light 70 is totally reflected at the evanescent light generating surface 16b, and evanescent light is thereby generated at the evanescent light generating surface 16b to permeate into the cladding layer 18. In the plasmon generator 20, surface plasmons are excited on the plasmon exciting section 20b through coupling with the aforementioned evanescent light. The excited surface plasmons propagate to the front end face 20a, and near-field light is generated from those excited surface plasmons at the front end face 20a.

The near-field light generated at the front end face 20a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 40 for data writing.

Now, functions and effects specific to the thermally-assisted magnetic recording head according to the present embodiment will be described. In the present embodiment, the plasmon generator 20 includes the first portion 21, the second portion 22 and the heat sink layer 23. The second portion 22 is located at a distance from the medium facing surface 80. In the present embodiment, the second portion 22 is configured to excite surface plasmons thereon. In order to allow more surface plasmons to be excited on the second portion 22 and enable efficient propagation of the surface plasmons, the second metal material used to form the second portion 22 preferably has a high electrical conductivity.

The first portion 21 includes the front end face 20a located in the medium facing surface 80. The first metal material used to form the first portion 21 thus preferably has a high Vickers hardness.

The first portion 21 generates heat because near-field light is generated at the front end face 20a. In order to dissipate the heat outwardly from the plasmon generator 20, the second metal material used to form the second portion 22 preferably has a high thermal conductivity.

In the present embodiment, the second metal material is lower in Vickers hardness and higher in electrical conductivity and thermal conductivity than the first metal material. This meets the above-described preferable conditions for the first and second metal materials.

If the first portion 21 and the second portion 22 are in contact with each other, the heat generated at the first portion 21 is transferred to the second portion 22 to cause the second portion 22 to get hot. Since the second metal material is lower in Vickers hardness than the first metal material, when the second portion 22 gets hot, the second portion 22 can become deformed such that the front end face 22a thereof gets farther from the medium facing surface 80.

The plasmon generator 20 according to the present embodiment includes the heat sink layer 23 interposed between the first portion 21 and the second portion 22. The third metal material used to form the heat sink layer 23 is higher in thermal conductivity than the first and second metal materials. This allows the heat generated at the first portion 21 to be dissipated outwardly from the plasmon generator 20 via the heat sink layer 23, thereby preventing a temperature rise of the second portion 22.

Further, the third metal material has a Vickers hardness lower than that of the first metal material and higher than that of the second metal material. This provides higher adhesion between the first portion 21 and the heat sink layer 23 and between the heat sink layer 23 and the second portion 22, when compared to the adhesion between the first portion 21 and the second portion 22 being in contact with each other. The present embodiment thereby allows the second portion 22 to be less susceptible to deformation.

Consequently, the present embodiment makes the plasmon generator 20 less susceptible to deformation and less likely to rise in temperature, thereby providing the plasmon generator 20 with improved reliability.

In the present embodiment, as shown in FIG. 1, the entirety of the heat sink layer 23 is located between the first imaginary plane P1 and the second imaginary plane P2. This configuration can be said to be such that the first portion 21 has a receiving section for receiving the heat sink layer 23, and the heat sink layer 23 is received in the receiving section. Such a configuration enables enhancement of the function of the heat sink layer 23 to dissipate heat generated at the first portion 21 outwardly from the plasmon generator 20.

Second Embodiment

A second embodiment of the present invention will now be described. In the present embodiment, the first metal material used to form the first portion 21 of the plasmon generator 20 is different from that in the first embodiment.

The first metal material in the present embodiment contains a first metal element and a second metal element. The first metal element is one of Rh, Ir, Ru and Pt. The second metal element is one of Au, Cu, Ag and Al. The second metal element is lower in Vickers hardness and higher in electrical conductivity and thermal conductivity than the first metal element.

The first metal material may be a solid solution alloy of the first metal element and the second metal element. In this case, a film of the first metal material can be formed by, for example, depositing the first metal element and the second metal element simultaneously by sputtering.

According to the present embodiment, the first metal material containing the first metal element and the second metal element allows for enhancement of the adhesion between the first portion 21 and the heat sink layer 23 when compared to the case where the first metal material is composed only of the first metal element. The reason for this will be described below with reference to FIG. 8 and FIG. 9.

Figure 8:
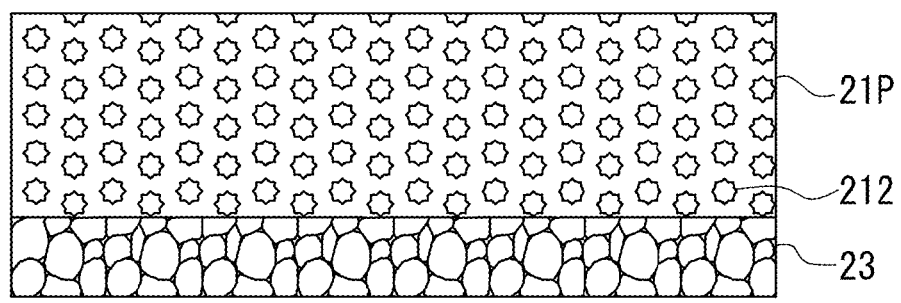
FIG. 8 is an explanatory diagram schematically showing the internal structure of a stack composed of a heat sink layer and a film of a first metal material on the heat sink layer in a plasmon generator according to a second embodiment of the invention.
Figure 9:
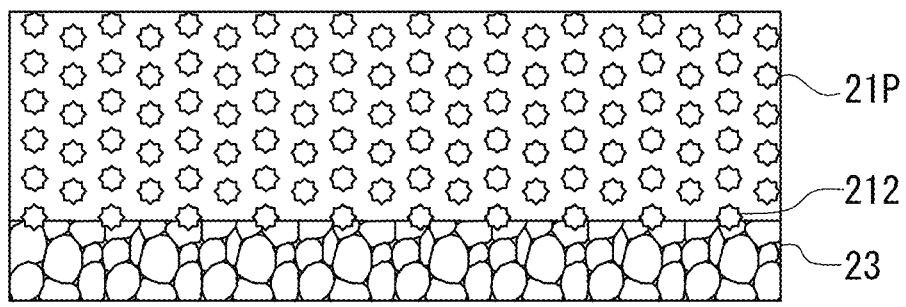
FIG. 9 is an explanatory diagram schematically showing the internal structure of the stack composed of the heat sink layer and the film of the first metal material on the heat sink layer in the plasmon generator according to the second embodiment of the invention.

Both FIG. 8 and FIG. 9 schematically illustrate the internal structure of a stack composed of the heat sink layer 23 and a film 21P of the first metal material on the heat sink layer 23. FIG. 8 shows the state immediately after deposition of the film 21P of the first metal material. FIG. 9 shows the state after the stack is heated from the state shown in FIG. 8.

In FIG. 8 and FIG. 9, the reference numeral 212 designates the second metal element in the film 21P. As shown in FIG. 9, heating the stack from the state shown in FIG. 8 causes the second metal element 212 in the film 21P to move into the heat sink layer 23. As a result, the adhesion between the heat sink layer 23 and the film 21P is enhanced. It is thus preferred to form the first portion 21 using the film 21P heated after deposition.

Further, according to the present embodiment, the use of the first metal material containing the first metal element and the second metal element makes the first portion 21 less susceptible to thermal deformation when compared to the case where the first metal material is composed only of the first metal element. The reason for this will be described below.

Figure 10:
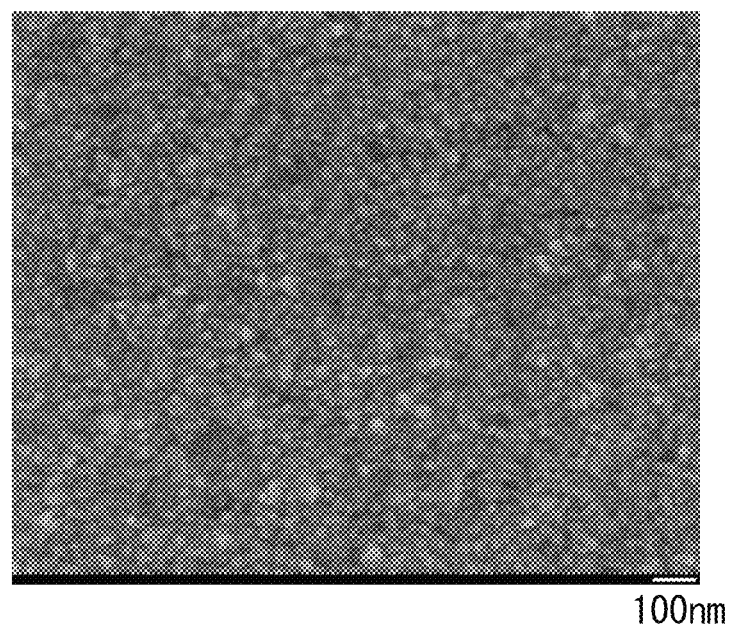
FIG. 10 shows a micrograph of a film formed only of Rh.
Figure 11:
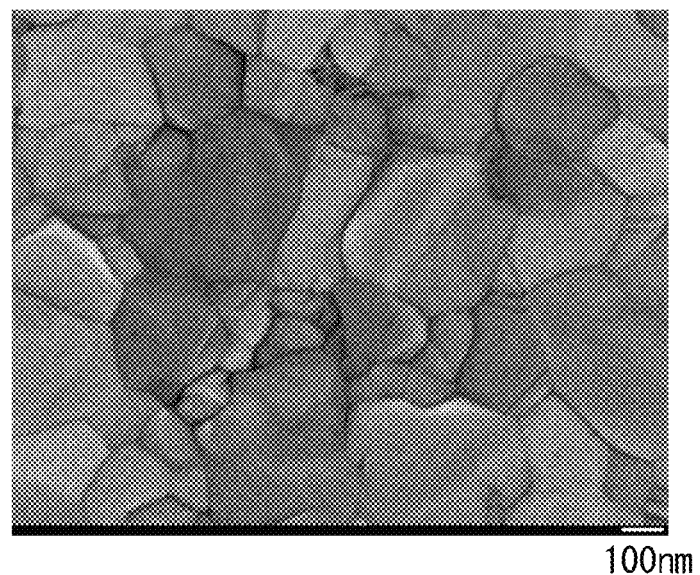
FIG. 11 shows a micrograph of a film formed only of Au.
Figure 12:
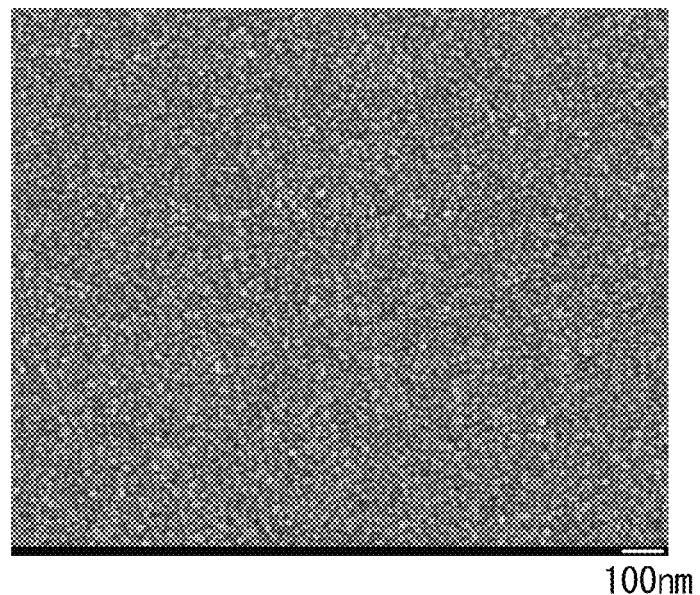
FIG. 12 shows a micrograph of a film of a solid solution alloy of Rh and Au.

FIG. 10 shows a micrograph of a film formed only of Rh. FIG. 11 shows a micrograph of a film formed only of Au. FIG. 12 shows a micrograph of a film of a solid solution alloy of Rh and Au. The proportions of Rh and Au in the solid solution alloy are both 50 at %.

As shown in FIG. 10 to FIG. 12, the film of the solid solution alloy is smaller in crystal grain diameter than the film formed only of Rh and the film formed only of Au. The smaller the crystal grain diameter, the less thermal deformation the film suffers.

Even when one of Ir, Ru and Pt is used as the first metal element in place of Rh or when one of Cu, Ag and Al is used as the second metal element in place of Au, a film formed of the first and second metal elements has a smaller crystal grain diameter than that of a film formed only of the first metal element.

Thus, the present embodiment makes the first portion 21 less susceptible to thermal deformation when compared to the case where the first metal material is composed only of the first metal element.

Figure 13:
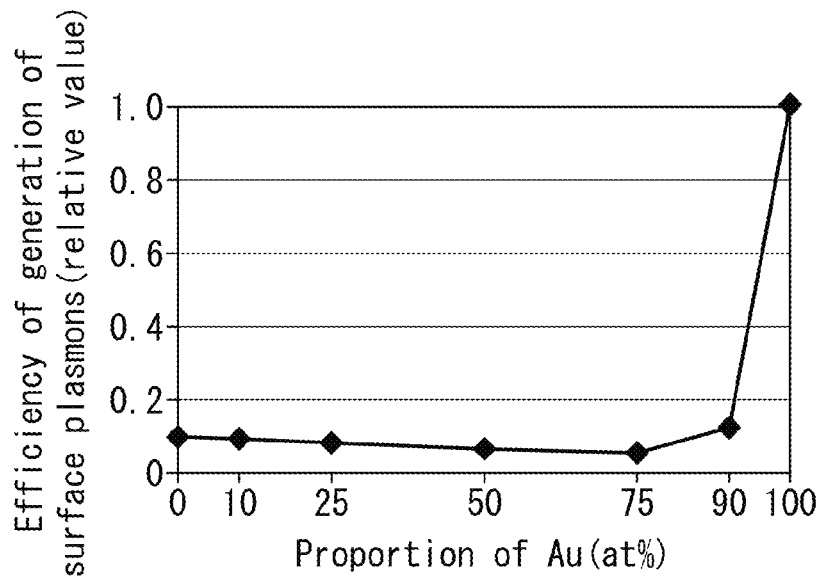
FIG. 13 is a characteristic diagram showing the relation of the proportion of Au in a film formed of at least one of Rh and Au to the efficiency of generation of surface plasmons.

A preferred range of the proportion of the second metal element in the first metal material will now be described with reference to FIG. 13 and FIG. 14. FIG. 13 is a characteristic diagram showing the relation of the proportion of Au in a film formed of at least one of Rh and Au to the efficiency of generation of surface plasmons. In FIG. 13 the horizontal axis represents the proportion of Au in the film. The vertical axis in FIG. 13 represents the efficiency of generation of surface plasmons on the film. The efficiency of generation is expressed in relative values with the efficiency of generation of surface plasmons on a film containing 100 at % Au taken as 1.

As shown in FIG. 13, when the proportion of Au is 90 at % or less, the efficiency of generation of surface plasmons is lower than when the proportion of Au is 100 at %. On the other hand, the efficiency of generation of surface plasmons does not greatly vary with the proportion of Au in the range of 0 to 75 at %.

Figure 14:
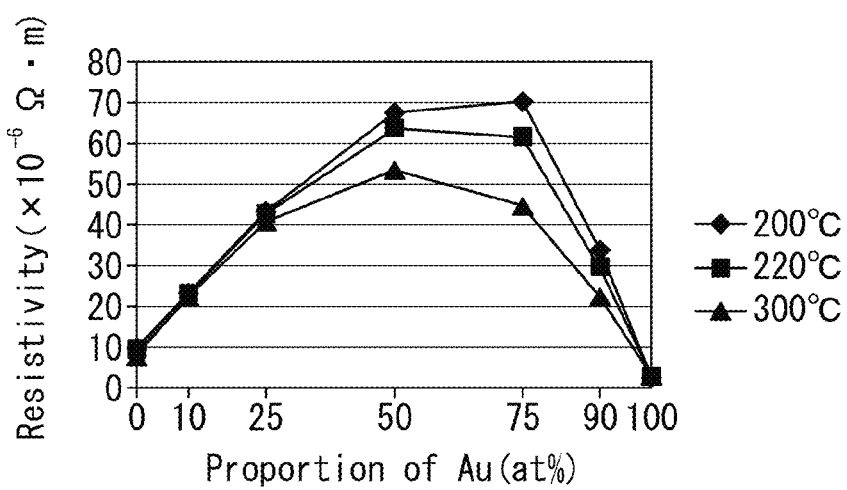
FIG. 14 is a characteristic diagram showing the relation of the proportion of Au in the film formed of at least one of Rh and Au to resistivity.

FIG. 14 is a characteristic diagram showing the relation of the proportion of Au in the film formed of at least one of Rh and Au to resistivity. In FIG. 14 the horizontal axis represents the proportion of Au in the film The vertical axis in FIG. 14 represents the resistivity of the film. FIG. 14 shows the resistivities of the film at 200° C., 220° C., and 300° C.

The smaller the crystal grain diameter of the film, the higher the resistivity of the film. It can be seen from FIG. 14 that when the proportion of Au is approximately 50 at %, the film has the highest resistivity and thus the smallest crystal grain diameter. If the proportion of Au falls within the range of 25 to 75 at %, it is possible to sufficiently reduce the crystal grain diameter of the film to thereby prevent the film from being thermally deformed. Further, as shown in FIG. 13, the efficiency of generation of surface plasmons on the film does not greatly vary with the proportion of Au in the range of 25 to 75 at %. Thus, the proportion of Au preferably falls within the range of 25 to 75 at %.

While FIGS. 13 and 14 show the characteristics of a film formed of at least one of Rh and Au, the same characteristics as in FIGS. 13 and 14 are obtainable when one of Ir, Ru and Pt is used in place of Rh or one of Cu, Ag and Al is used in place of Au.

Thus, when the first metal material is composed of the first and second metal elements, the proportion of the second metal element in the first metal material preferably falls within the range of 25 to 75 at %.

The remainder of configuration, function and effects of the present embodiment are similar to those of the first embodiment.

Third Embodiment

Figure 15:
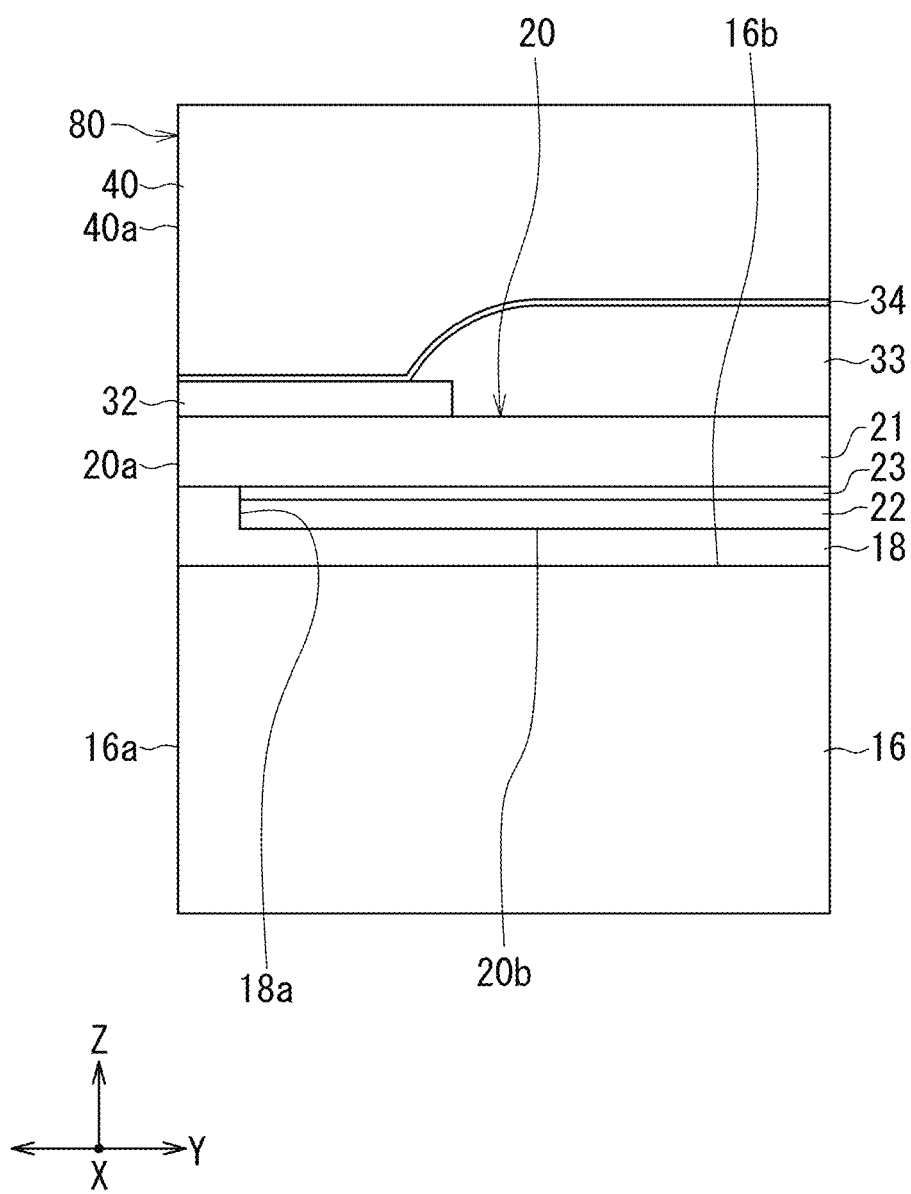
FIG. 15 is a cross-sectional view showing the main part of a thermally-assisted magnetic recording head according to a third embodiment of the invention.

A third embodiment of the invention will now be described. FIG. 15 is a cross-sectional view showing the main part of a thermally-assisted magnetic recording head according to the present embodiment.

In the present embodiment, the plasmon generator 20 is configured differently than in the first embodiment in the following ways. In the present embodiment, the second portion 22 and the heat sink layer 23 are received in the receiving section 18a of the cladding layer 18. The heat sink layer 23 is interposed between the first portion 21 and the second portion 22. The top surface of the cladding layer 18 and the top surface of the heat sink layer 23 are coplanar. The second portion 22 and the heat sink layer 23 have the same planar shape.

In the present embodiment, the first portion 21 has no receiving section for receiving the heat sink layer 23. Further, the heat sink layer 23 is not located between the first imaginary plane P1 and the second imaginary plane P2 defined in relation to the first embodiment.

The second portion 22 and the heat sink layer 23 of the present embodiment are formed in the following manner, for example. First, the second portion 22 is formed in the receiving section 18a into a thickness smaller than the depth of the receiving section 18a. Then, a metal film to become the heat sink layer 23 is formed to cover the cladding layer 18 and the second portion 22. The metal film is then polished by, for example, chemical mechanical polishing (CMP), until the cladding layer 18 is exposed. This polishing makes the metal film into the heat sink layer 23.

In the present embodiment, the first portion 21 may be formed of the first metal material of the second embodiment. The remainder of configuration, function and effects of the present embodiment are similar to those of the first or second embodiment.

Fourth Embodiment

Figure 16:
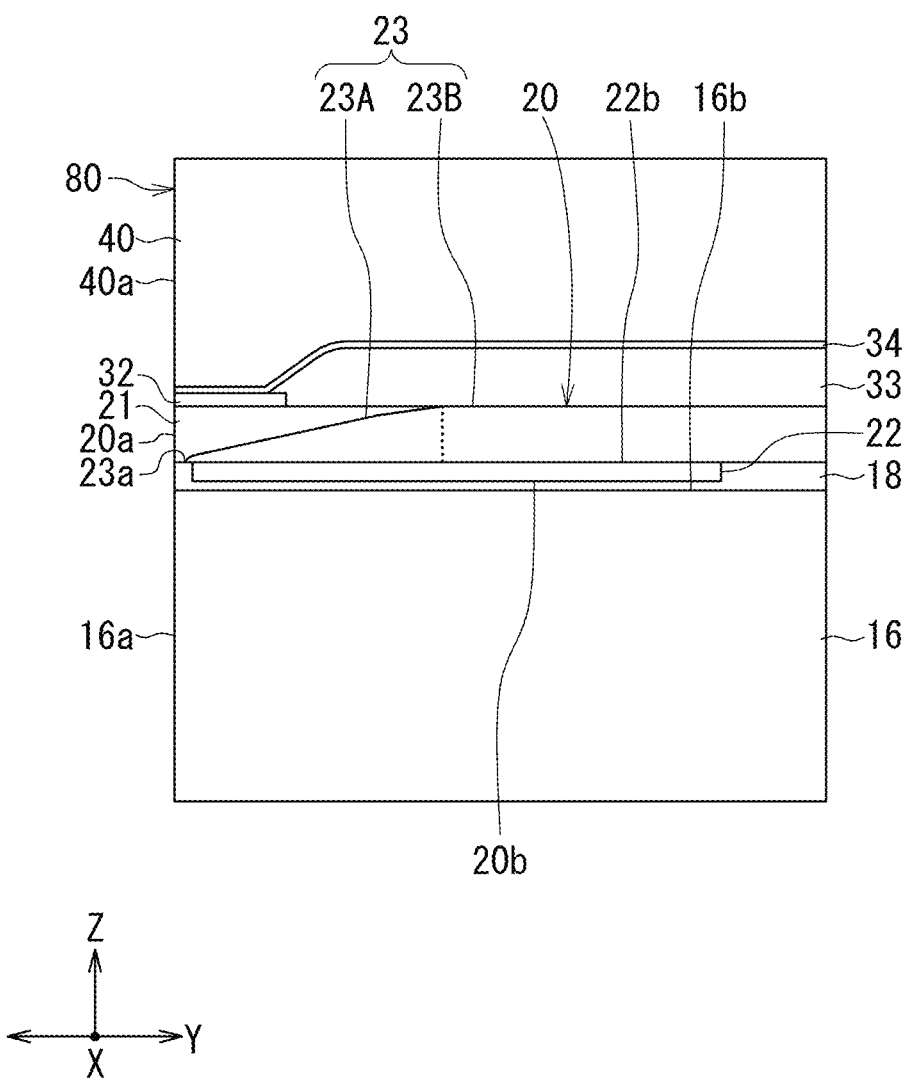
FIG. 16 is a cross-sectional view showing the main part of a thermally-assisted magnetic recording head according to a fourth embodiment of the invention.

A fourth embodiment of the invention will now be described. FIG. 16 is a cross-sectional view showing the main part of a thermally-assisted magnetic recording head according to the present embodiment.

In the present embodiment, the plasmon generator 20 is configured differently than in the first embodiment in the following ways. In the present embodiment, the heat sink layer 23 includes a thickness-changing portion 23A and a constant thickness portion 23B. The thickness-changing portion 23A is located between the constant thickness portion 23B and the medium facing surface 80. In FIG. 16 the boundary between the thickness-changing portion 23A and the constant thickness portion 23B is shown by a dotted line.

The thickness-changing portion 23A includes the front end 23a of the heat sink layer 23. In the thickness-changing portion 23A, the thickness in a direction perpendicular to the contact surface 22b of the second portion 22, i.e., the Z direction, decreases with decreasing distance to the front end face 20a of the plasmon generator 20. In the constant thickness portion 23B, the thickness in the direction perpendicular to the contact surface 22b (the Z direction) is constant regardless of distance to the front end face 20a.

The top surface of the constant thickness portion 23B is in contact with the bottom surface of the heat sink 33. In the present embodiment, the entirety of the heat sink layer 23 is located between the first imaginary plane P1 and the second imaginary plane P2 defined in relation to the first embodiment.

The heat sink layer 23 of the present embodiment is formed by, for example, first forming a film by a lift-off process and then patterning the film by ion beam etching. The formation of the heat sink layer 23 including the thickness-changing portion 23A is thus easy. Further, the presence of the thickness-changing portion 23A in the heat sink layer 23 facilitates precise patterning of a portion of the heat sink layer 23 near the front end 23a.

According to the present embodiment, the thickness-changing portion 23A increases in thickness with increasing distance from the front end face 20a, and the top surface of the constant thickness portion 23B is in contact with the bottom surface of the heat sink 33. This enhances the function of the heat sink layer 23.

In the present embodiment, the first portion 21 may be formed of the first metal material of the second embodiment. The remainder of configuration, function and effects of the present embodiment are similar to those of the first or second embodiment.

Fifth Embodiment

Figure 17:
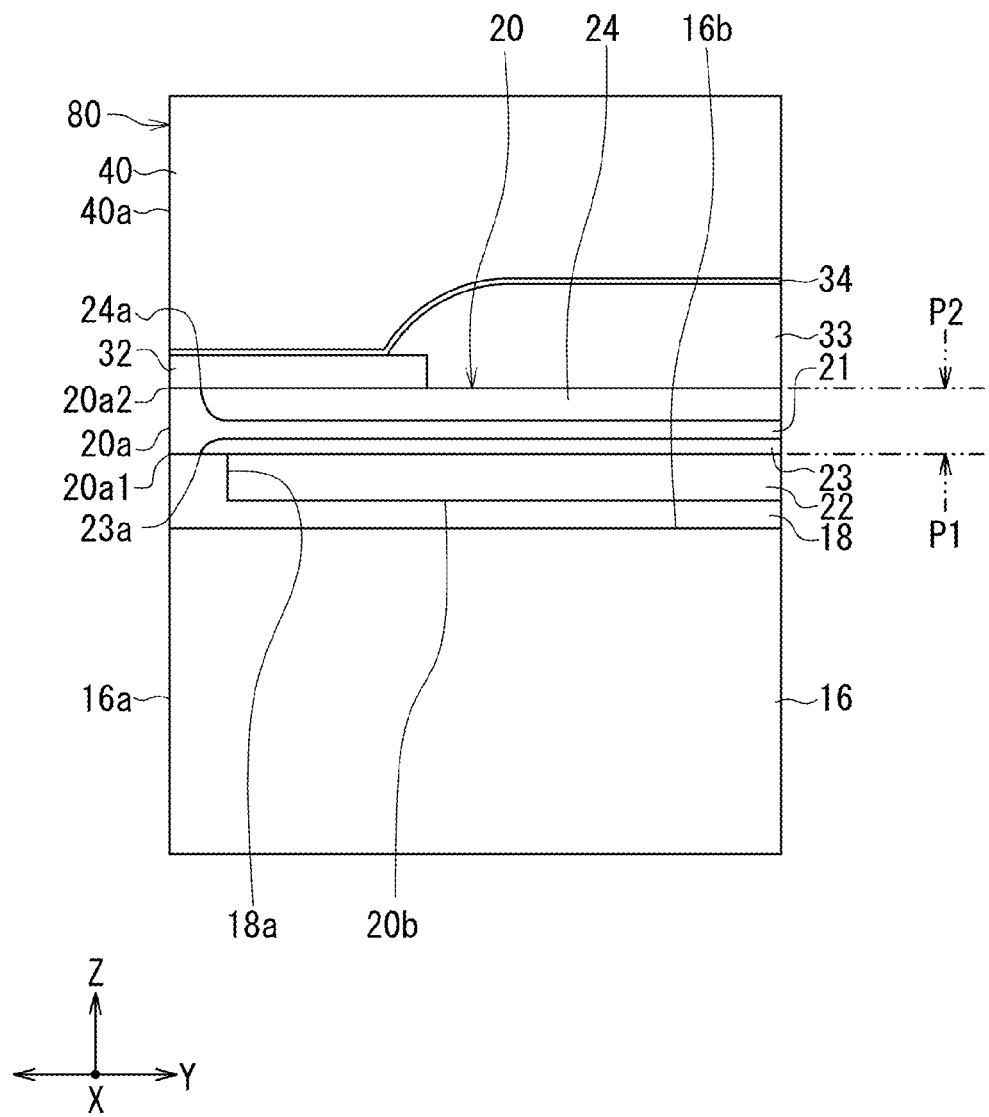
FIG. 17 is a cross-sectional view showing the main part of a thermally-assisted magnetic recording head according to a fifth embodiment of the invention.
Figure 18:
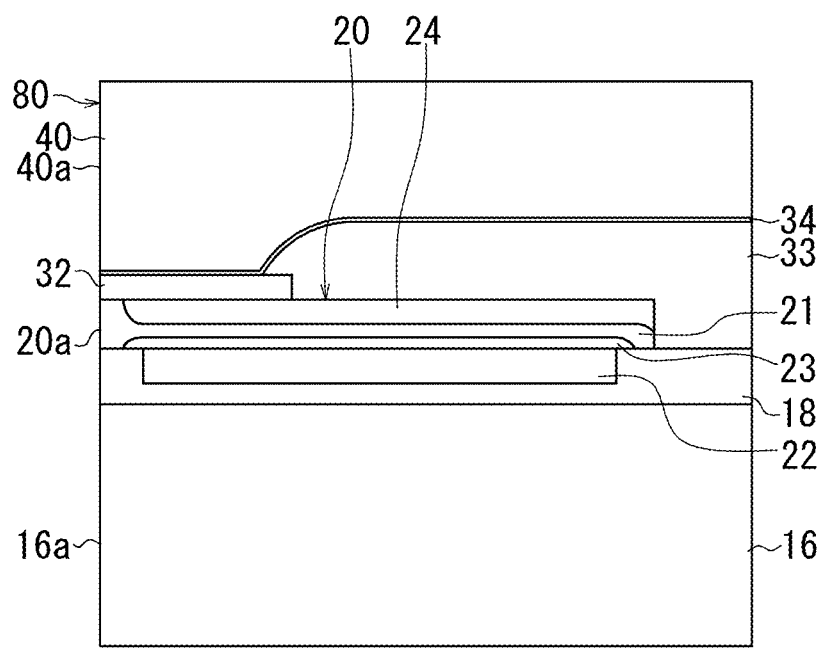
FIG. 18 is a cross-sectional view showing the main part of the thermally-assisted magnetic recording head according to the fifth embodiment of the invention.
Figure 18:
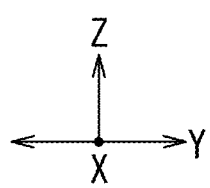

A fifth embodiment of the invention will now be described. FIG. 17 is a cross-sectional view showing the main part of a thermally-assisted magnetic recording head according to the present embodiment. FIG. 18 is a cross-sectional view providing a broader view of the main part of the thermally-assisted magnetic recording head according to the present embodiment of FIG. 17.

In the present embodiment, the plasmon generator 20 is configured differently than in the first embodiment in the following ways. The plasmon generator 20 according to the present embodiment includes a heat sink layer 24 formed of a fourth metal material, in addition to the components of the plasmon generator 20 according to the first embodiment. The heat sink layer 24 corresponds to the second heat sink layer of the plasmon generator of the first aspect of the present invention.

The heat sink layer 24 is interposed between the first portion 21 and the insulating film 32, and between the first portion 21 and the heat sink 33. The heat sink layer 24 is located at a distance from the front end face 20a and in contact with the first portion 21.

The heat sink layer 24 has a front end 24a closest to the medium facing surface 80. The front end 24a is located at a distance of, for example, 10 to 50 nm from the medium facing surface 80, the distance preferably falling within the range of 10 to 30 nm. For example, the thickness of the heat sink layer 24 in the Z direction falls within the range of 15 to 100 nm, and preferably within the range of 20 to 40 nm.

The fourth metal material is lower in Vickers hardness and higher in thermal conductivity than the first metal material used to form the first portion 21. An example of the fourth metal material is Cu.

In the present embodiment, at least part of the heat sink layer 23 and at least part of the heat sink layer 24 may be located between the first imaginary plane P1 and the second imaginary plane P2 defined in relation to the first embodiment. In the example shown in FIG. 17, the entirety of the heat sink layer 23 and the entirety of the heat sink layer 24 are located between the first imaginary plane P1 and the second imaginary plane P2. In this example, the heat sink layer 24 is not in contact with the heat sink layer 23.

According to the present embodiment, the presence of the two heat sink layers 23 and 24 in contact with the first portion 21 allows for more effective dissipation of the heat generated by the first portion 21 to the outside of the plasmon generator 20.

Figure 19:
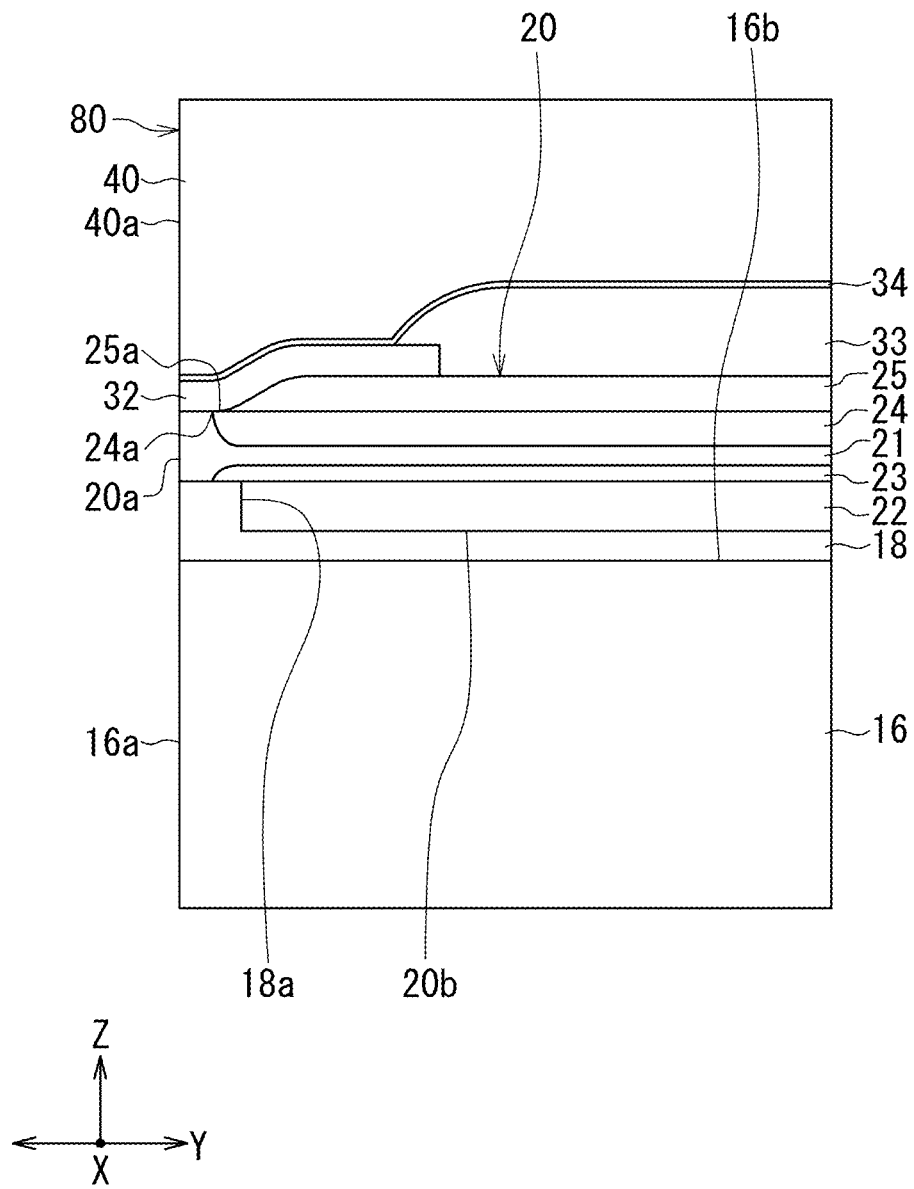
FIG. 19 is a cross-sectional view showing the main part of a thermally-assisted magnetic recording head of a first modification example of the fifth embodiment of the invention.

Now, a first to a third modification example of the present embodiment will be described. FIG. 19 is a cross-sectional view showing the main part of a thermally-assisted magnetic recording head of the first modification example. The plasmon generator 20 of the first modification example includes a heat sink layer 25 formed of the fourth metal material, in addition to the components of the plasmon generator 20 shown in FIG. 17. The heat sink layer 25 is interposed between the heat sink layer 24 and the insulating film 32 and between the heat sink layer 24 and the heat sink 33.

The heat sink layer 25 has a front end 25a closest to the medium facing surface 80. The front end 25a is located at a greater distance from the medium facing surface 80 than is the front end 24a of the heat sink layer 24. The insulating film 32 lies over respective portions of the top surfaces of the first portion 21, the heat sink layer 24 and the heat sink layer 25.

Figure 20:
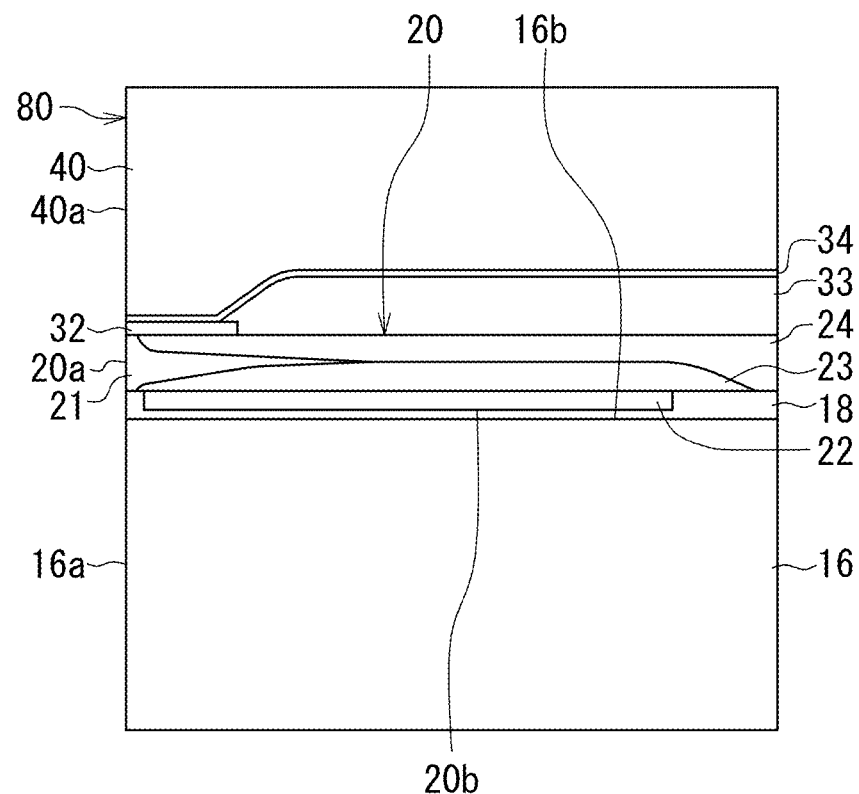
FIG. 20 is a cross-sectional view showing the main part of a thermally-assisted magnetic recording head of a second modification example of the fifth embodiment of the invention.
Figure 20:
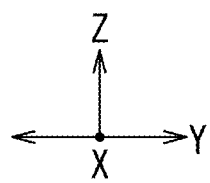
Figure 21:
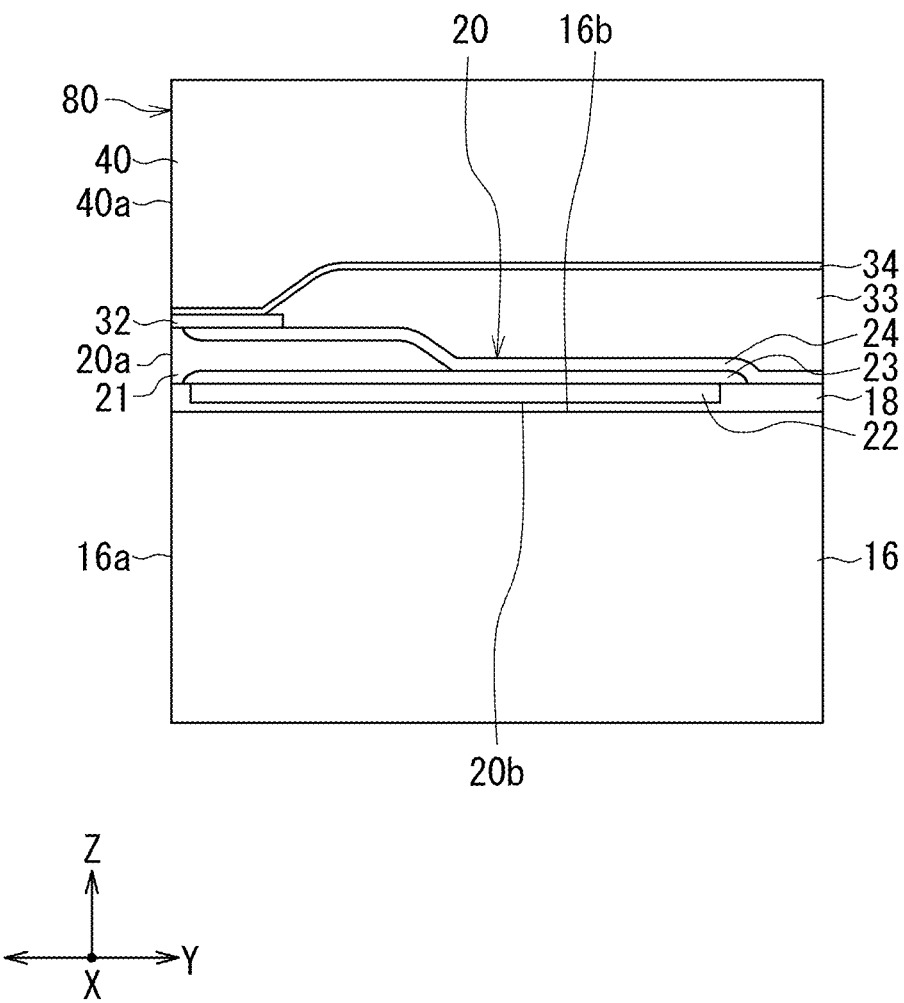
FIG. 21 is a cross-sectional view showing the main part of a thermally-assisted magnetic recording head of a third modification example of the fifth embodiment of the invention.

FIG. 20 is a cross-sectional view showing the main part of a thermally-assisted magnetic recording head of the second modification example. FIG. 21 is a cross-sectional view showing the main part of a thermally-assisted magnetic recording head of the third modification example. The plasmon generator 20 of the second modification example and the plasmon generator 20 of the third modification example are both different from the plasmon generator 20 shown in FIG. 17 in that the heat sink layer 24 is in contact with the heat sink layer 23.

In the plasmon generator 20 of the second modification example shown in FIG. 20, each of the heat sink layers 23 and 24 includes a thickness-changing portion whose thickness in the Z direction decreases toward the front end. In the thickness changing portion, the thickness in the Z direction decreases with decreasing distance to the front end face.

In the plasmon generator 20 of the third modification example shown in FIG. 21, each of the heat sink layers 23 and 24 has a thickness that is substantially constant regardless of distance from the front end thereof. In the third modification example, the heat sink 33 includes a first portion lying above the first portion 21 of the plasmon generator 20, and a second portion lying above the interface between the heat sink layers 23 and 24. The second portion is greater than the first portion in thickness in the Z direction.

In the present embodiment, the first portion 21 may be formed of the first metal material of the second embodiment. The remainder of configuration, function and effects of the present embodiment are similar to those of the first or second embodiment.

Sixth Embodiment

Figure 22:
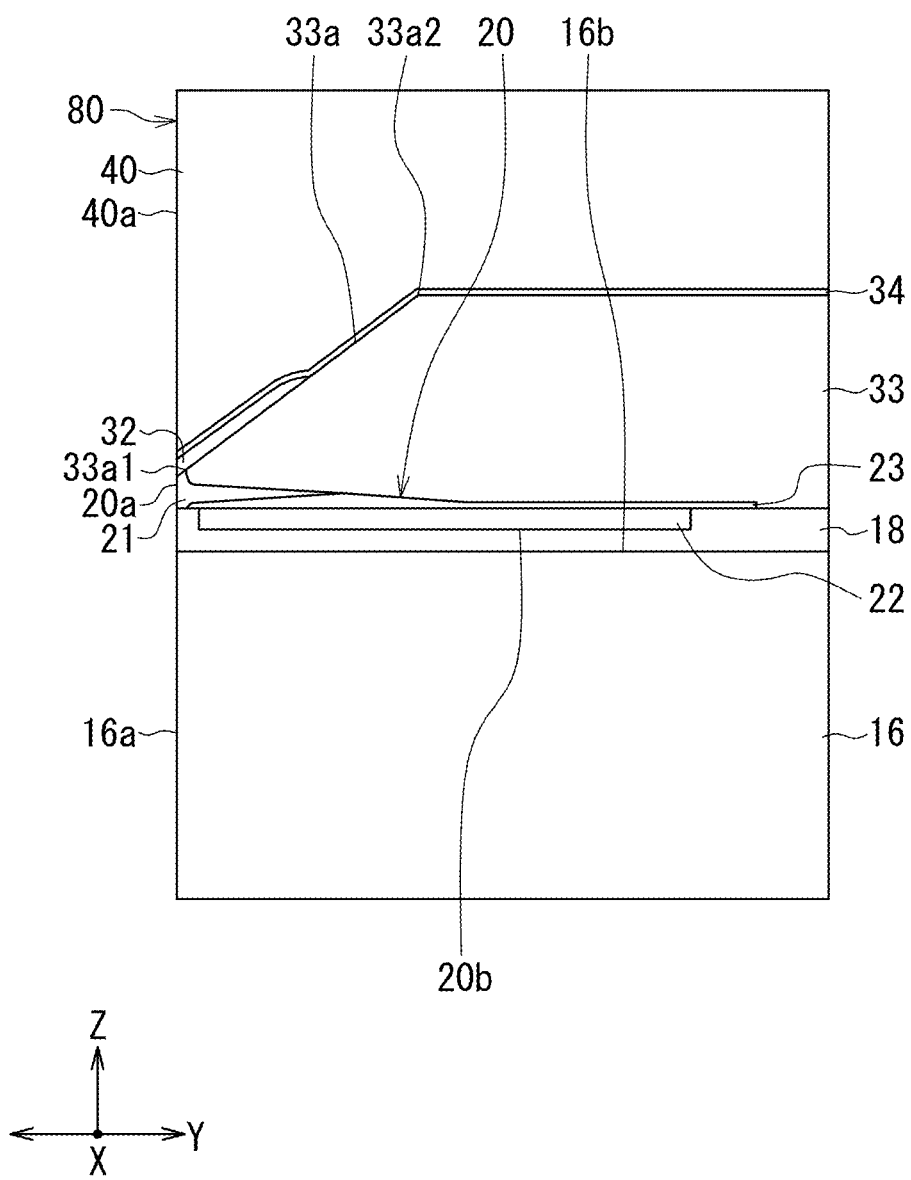
FIG. 22 is a cross-sectional view showing the main part of a thermally-assisted magnetic recording head according to a sixth embodiment of the invention.

A sixth embodiment of the invention will now be described. FIG. 22 is a cross-sectional view showing the main part of a thermally-assisted magnetic recording head according to the present embodiment.

The thermally-assisted magnetic recording head according to the present embodiment is configured differently than in the first embodiment in the following ways. In the present embodiment, the heat sink 33 is in contact with the first portion 21 and the heat sink layer 23 of the plasmon generator 20.

The heat sink 33 has an inclined surface 33a facing toward the medium facing surface 80. The inclined surface 33a has a first end 33a1 closest to the plasmon generator 20, and a second end 33a2 farthest from the plasmon generator 20. The inclined surface 33a is inclined with respect to the medium facing surface 80 such that the second end 33a2 is at a greater distance from the medium facing surface 80 than is the first end 33a1. The main pole 40 includes a portion located between the inclined surface 33a and the medium facing surface 80. The heat sink 33 of the present embodiment is preferably formed of Cu, in particular.

According to the present embodiment, it is possible to bring the first end 33a1 of the inclined surface 33a of the heat sink 33 close to the front end face 20a of the plasmon generator 20. The present embodiment thus allows for more effective dissipation of the heat generated by the first portion 21 to the outside of the plasmon generator 20.

In the present embodiment, the first portion 21 may be formed of the first metal material of the second embodiment. The remainder of configuration, function and effects of the present embodiment are similar to those of the first or second embodiment.

Seventh Embodiment

Figure 23:
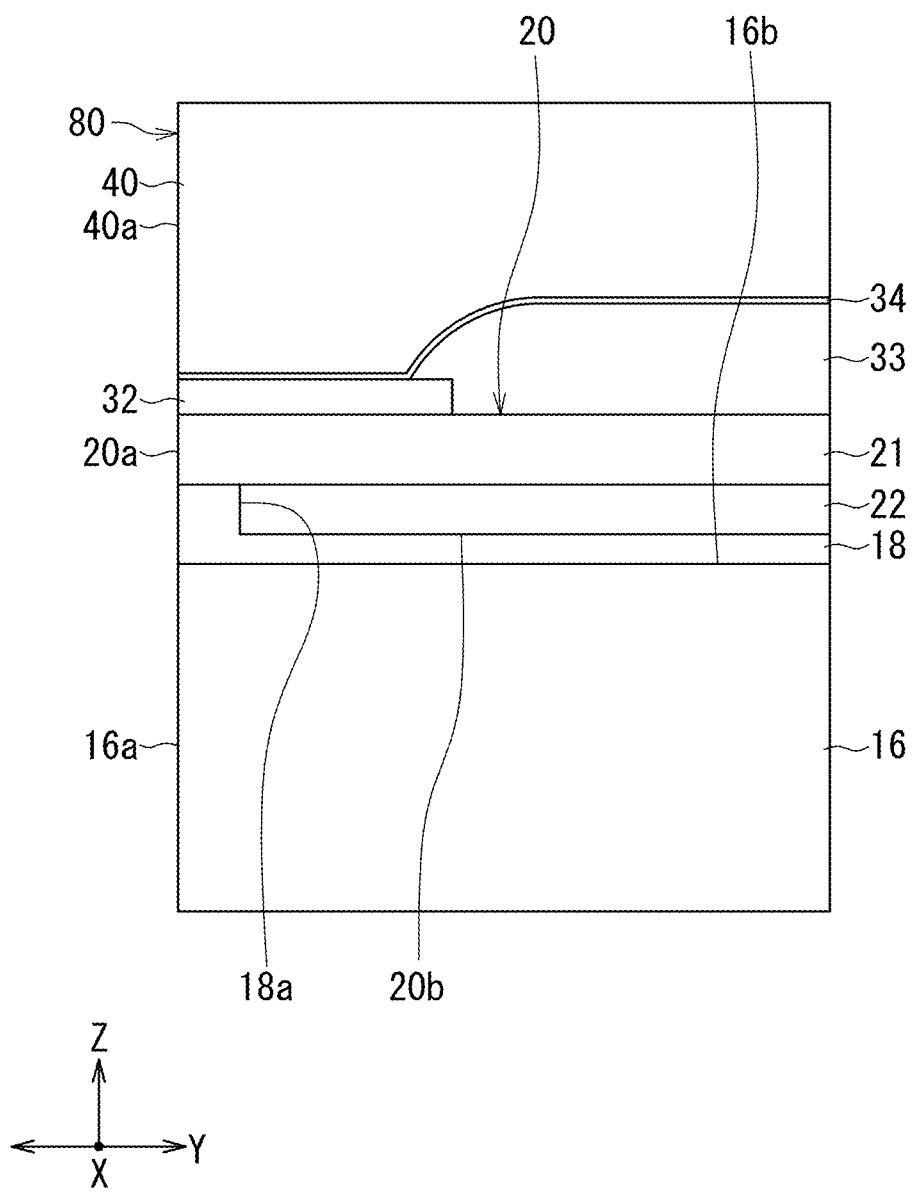
FIG. 23 is a cross-sectional view showing the main part of a thermally-assisted magnetic recording head according to a seventh embodiment of the invention.

A seventh embodiment of the invention will now be described. FIG. 23 is a cross-sectional view showing the main part of a thermally-assisted magnetic recording head according to the present embodiment.

In the present embodiment, the plasmon generator 20 is configured differently than in the first embodiment in the following ways. In the present embodiment, the plasmon generator 20 does not include the heat sink layer 23. The top surface of the cladding layer 18 and the top surface of the second portion 22 are coplanar. The top surface of the second portion 22 is in contact with the bottom surface of the first portion 21.

In the present embodiment, the first metal material used to form the first portion 21 contains one of Rh, Ir, Ru and Pt. The second metal material used to form the second portion 22 is Cu.

Cu is higher in thermal conductivity and Vickers hardness than Au. The present embodiment thus allows for enhancement of the adhesion between the first portion 21 and the second portion 22 when compared to the case where the second portion 22 is formed of Au, and allows the second portion 22 to be less susceptible to deformation. Further, the present embodiment allows the heat generated by the first portion 21 to be dissipated outwardly from the plasmon generator 20 more effectively. Consequently, the present embodiment makes the plasmon generator 20 less susceptible to deformation and less likely to rise in temperature, thereby providing the plasmon generator 20 with improved reliability.

In the present embodiment, the first portion 21 may be formed of the first metal material of the second embodiment, i.e., a metal material containing the first metal element and the second metal element. In that case, it becomes possible to make the adhesion between the first portion 21 and the second portion 22 higher, and make the first portion 21 less susceptible to thermal deformation, when compared to the case where the first metal material is composed only of the first metal element.

The second portion 22 may include a first layer of Au and a second layer of Cu lying on the first layer.

The remainder of configuration, function and effects of the present embodiment are similar to those of the first or second embodiment.

Eighth Embodiment

Figure 24:
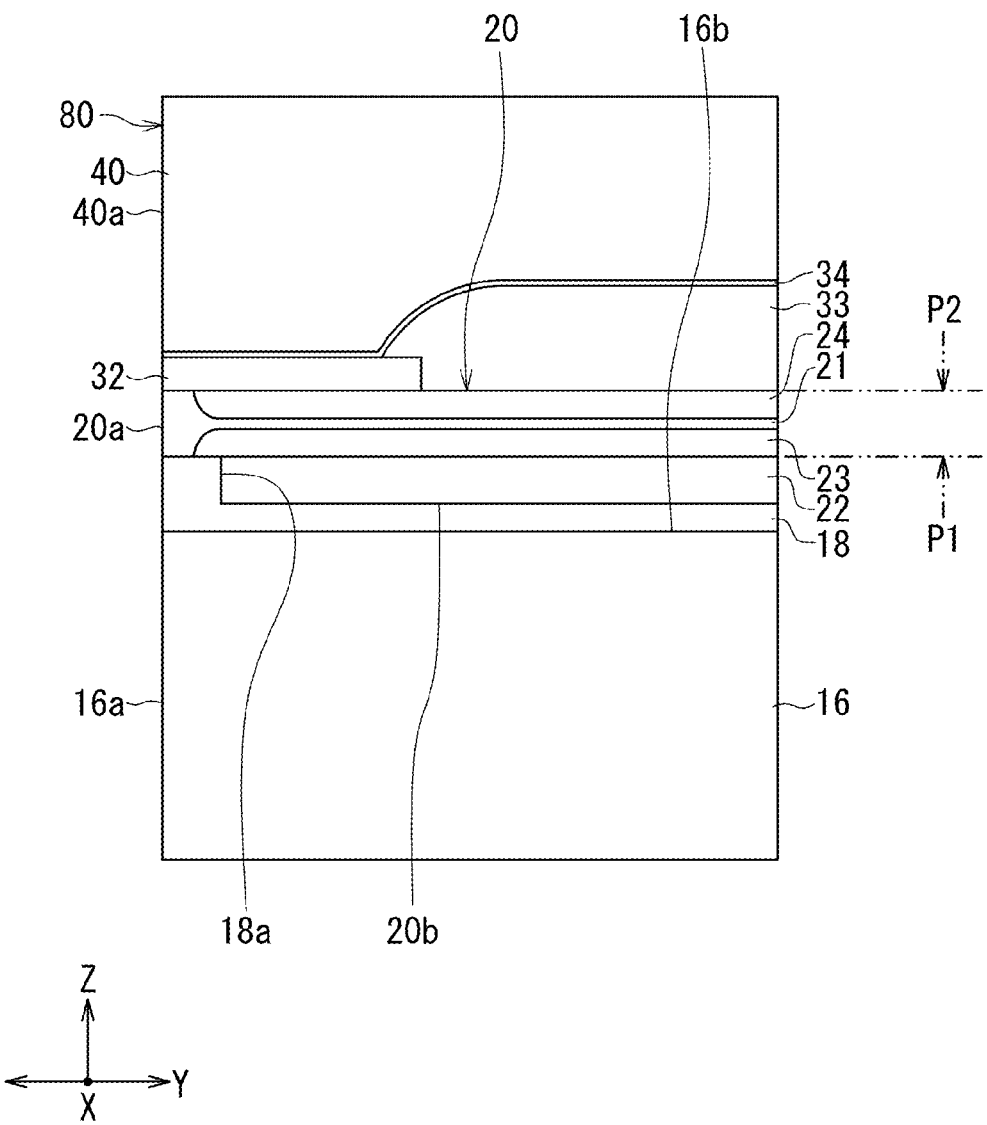
FIG. 24 is a cross-sectional view showing the main part of a thermally-assisted magnetic recording head according to an eighth embodiment of the invention.

An eighth embodiment of the invention will now be described. FIG. 24 is a cross-sectional view showing the main part of a thermally-assisted magnetic recording head according to the present embodiment.

The plasmon generator 20 according to the present embodiment is configured differently than the plasmon generator 20 according to the fifth embodiment shown in FIG. 17 in the following ways. In the present embodiment, the first metal material used to form the first portion 21 contains one of Rh, Ir, Ru and Pt. The second metal material used to form the second portion 22 is Cu. Both of the heat sink layers 23 and 24 are formed of Cu.

At least part of the heat sink layer 23 and at least part of the heat sink layer 24 may be located between the first imaginary plane P1 and the second imaginary plane P2 defined in relation to the first embodiment. In the example shown in FIG. 24, the entirety of the heat sink layer 23 and the entirety of the heat sink layer 24 are located between the first imaginary plane P1 and the second imaginary plane P2, hi this example, the heat sink layer 24 is not in contact with the heat sink layer 23. Alternatively, however, the heat sink layer 24 may be in contact with the heat sink layer 23.

In the present embodiment, the first portion 21 may be formed of the first metal material of the second embodiment. The second portion 22 may include a first layer of Au and a second layer of Cu lying on the first layer. The remainder of configuration, function and effects of the present embodiment are similar to those of the fifth embodiment.

Ninth Embodiment

Figure 25:
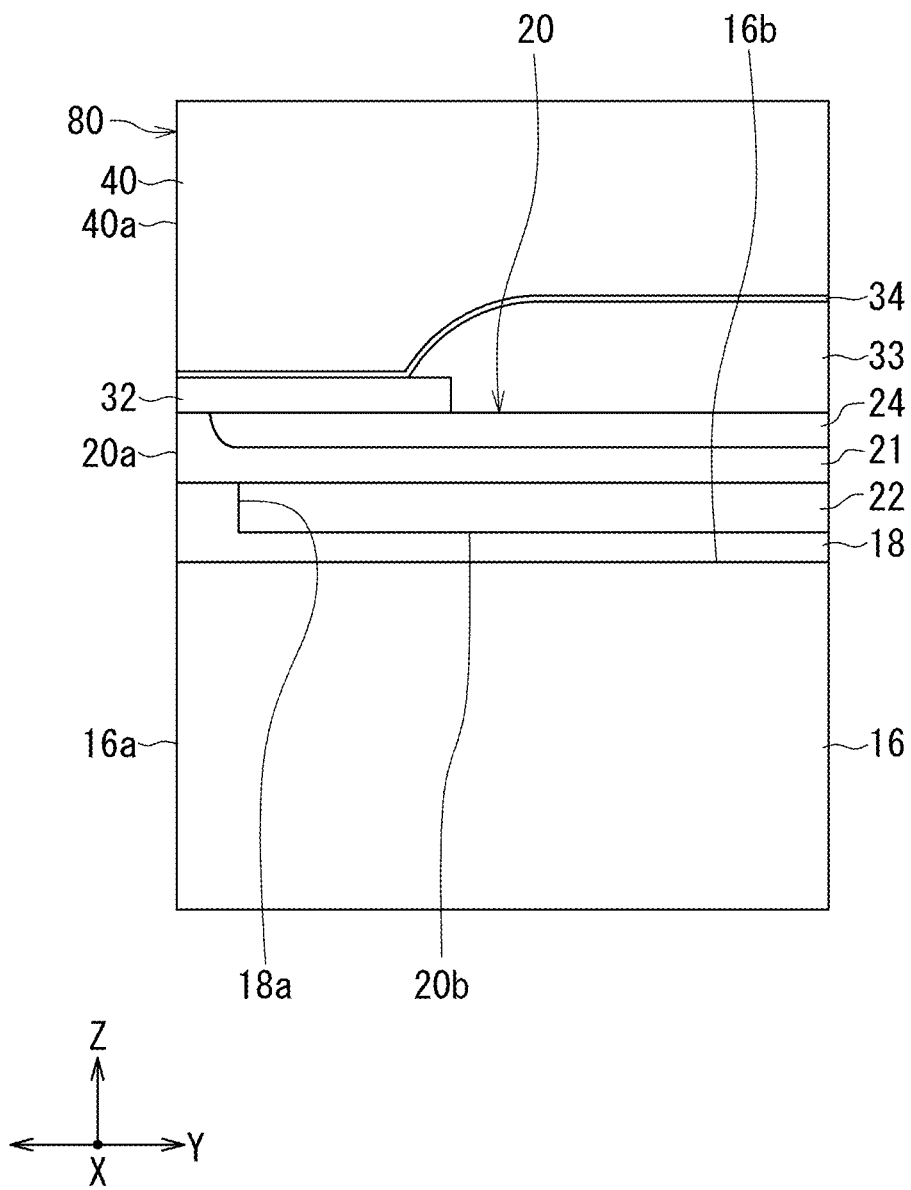
FIG. 25 is a cross-sectional view showing the main part of a thermally-assisted magnetic recording head according to a ninth embodiment of the invention.

A ninth embodiment of the invention will now be described. FIG. 25 is a cross-sectional view showing the main part of a thermally-assisted magnetic recording head according to the present embodiment.

The plasmon generator 20 according to the present embodiment is configured differently than the plasmon generator 20 according to the fifth embodiment shown in FIG. 17 in the following ways. In the present embodiment, the heat sink layer 23 is not provided. The top surface of the cladding layer 18 and the top surface of the second portion 22 are coplanar. The top surface of the second portion 22 is in contact with the bottom surface of the first portion 21.

The first metal material used to form the first portion 21 contains one of Rh, Ir, Ru and Pt, for example. The second metal material used to form the second portion 22 is one of Au, Cu, Ag and Al, for example.

In the present embodiment, the heat sink 33 is formed of a metal material that is lower in Vickers hardness and higher in thermal conductivity than the first metal material. The heat sink layer 24 is formed of a metal material that has a thermal conductivity higher than that of each of the first metal material and the metal material used to form the heat sink 33, and a Vickers hardness lower than that of the first metal material and higher than that of the metal material used to form the heat sink 33. For example, the metal material used to form the heat sink 33 is Au, and the metal material used to form the heat sink layer 24 is Cu.

The plasmon generator 20 shown in FIG. 25 is otherwise configured in the same manner as the plasmon generator 20 shown in FIG. 17.

Figure 26:
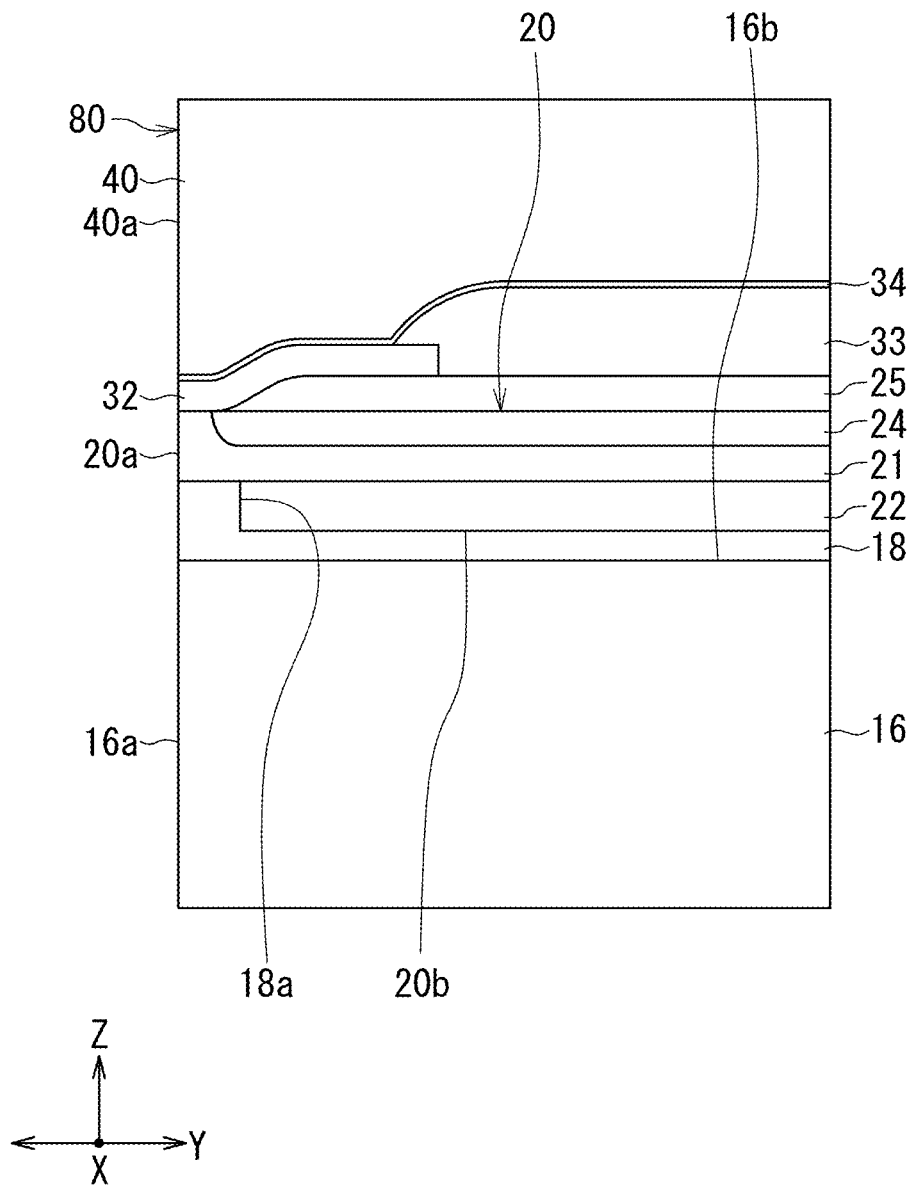
FIG. 26 is a cross-sectional view showing the main part of a thermally-assisted magnetic recording head of a first modification example of the ninth embodiment of the invention.

FIG. 26 is a cross-sectional view showing the main part of a thermally-assisted magnetic recording head of a first modification example of the present embodiment. The plasmon generator 20 of the first modification example includes a heat sink layer 25 in addition to the components of the plasmon generator 20 shown in FIG. 25. The heat sink layer 25 is interposed between the heat sink layer 24 and the insulating film 32, and between the heat sink layer 24 and the heat sink 33.

The heat sink layer 25 is formed of a metal material that has a thermal conductivity higher than that of each of the first metal material and the metal material used to form the heat sink 33, and a Vickers hardness lower than that of the first metal material and higher than that of the metal material used to form the heat sink 33. The metal material used to form the heat sink layer 25 is Cu, for example.

Figure 27:
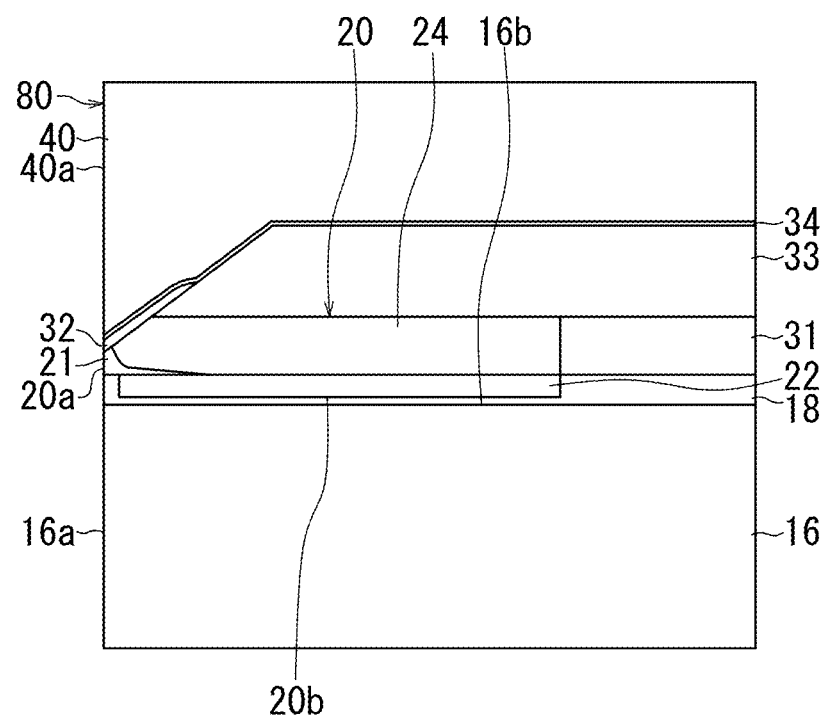
FIG. 27 is a cross-sectional view showing the main part of a thermally-assisted magnetic recording head of a second modification example of the ninth embodiment of the invention.
Figure 27:
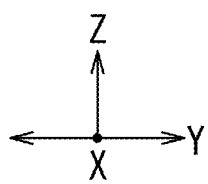

FIG. 27 is a cross-sectional view showing the main part of a thermally-assisted magnetic recording head of a second modification example of the present embodiment. In the plasmon generator 20 of the second modification example, the heat sink layer 24 is in contact with the first portion 21 and the second portion 22 of the plasmon generator 20.

In the second modification example, at least part of the heat sink layer 24 may be located between the first imaginary plane P1 and the second imaginary plane P2 defined in relation to the first embodiment. In the example shown in FIG. 27, part of the heat sink layer 24 is located between the first imaginary plane P1 and the second imaginary plane P2. The remainder of the heat sink layer 24 is located above the second imaginary plane P2.

In the second modification example, a stack composed of the heat sink layer 24 and the heat sink 33 will be referred to as the heat sink stack. The heat sink stack has an inclined surface of the same shape as the inclined surface 33a of the heat sink 33 shown in FIG. 22. The main pole 40 includes a portion located between the aforementioned inclined surface and the medium facing surface 80.

The present embodiment allows for enhancement of the adhesion between the first portion 21 and the heat sink layer 24 and the adhesion between the heat sink layer 24 or 25 and the heat sink 33. Further, the present embodiment allows the heat generated by the first portion 21 to be dissipated outwardly from the plasmon generator 20 more effectively. Consequently, the present embodiment allows for improvement of the reliability of the plasmon generator 20.

In the present embodiment, the first portion 21 may be formed of the first metal material of the second embodiment, i.e., a metal material containing the first metal element and the second metal element. In that case, it becomes possible to make the adhesion between the first portion 21 and the heat sink layer 24 higher, and make the first portion 21 less susceptible to thermal deformation, when compared to the case where the first metal material is composed only of the first metal element.

The remainder of function and effects of the present embodiment are the same as those of the fifth embodiment, except for the function and effects resulting from the heat sink layer 23 of the fifth embodiment.

Tenth Embodiment

Figure 28:
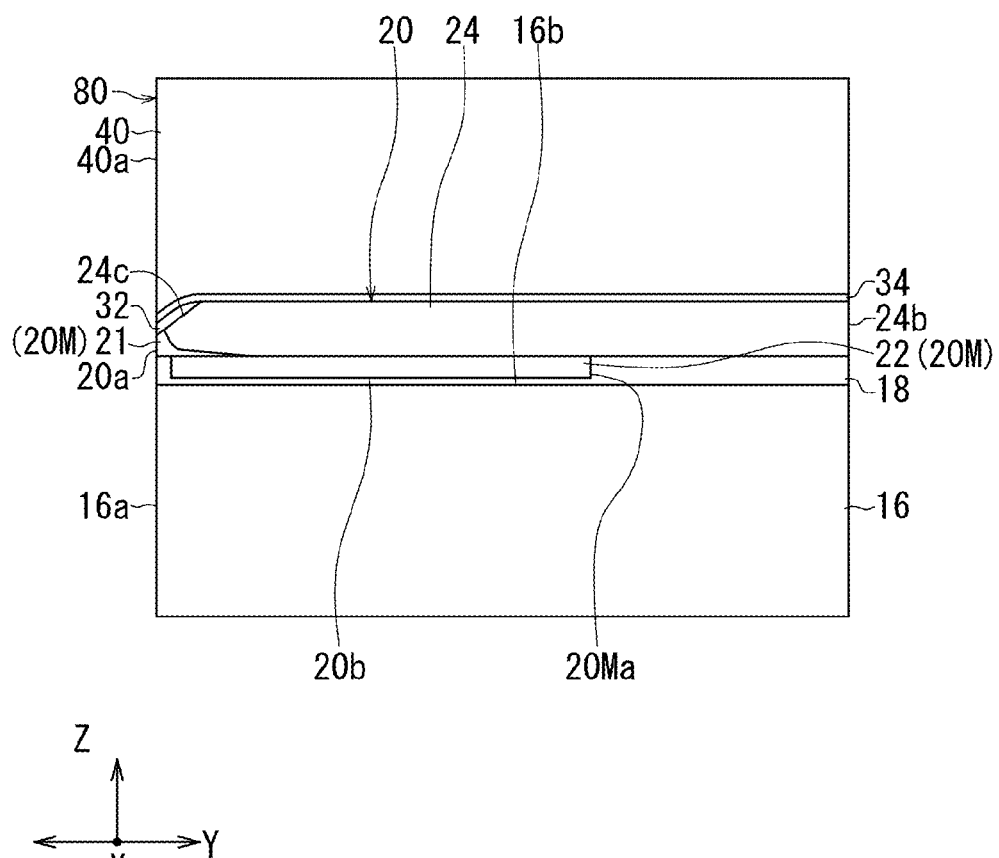
FIG. 28 is a cross-sectional view showing the main part of a thermally-assisted magnetic recording head according to a tenth embodiment of the invention.

A tenth embodiment of the invention will now be described. FIG. 28 is a cross-sectional view showing the main part of a thermally-assisted magnetic recording head according to the present embodiment.

The thermally-assisted magnetic recording head according to the present embodiment differs from the thermally-assisted magnetic recording head of the second modification example of the ninth embodiment shown in FIG. 27 in the following ways. The thermally-assisted magnetic recording head according to the present embodiment does not include the heat sink 33.

In the present embodiment, the entire part of the plasmon generator 20 excluding the heat sink layer 24 will be called the main part 20M. The main part 20M includes the front end face 20a. The heat sink layer 24 is in contact with the main part 20M.

The main part 20M includes the first portion 21. In the present embodiment, the main part 20M is constituted by the first portion 21 and the second portion 22, in particular. The main part 20M has a first rear end 20Ma farthest from the front end face 20a (the medium facing surface 80). The heat sink layer 24 has a second rear end 24b farthest from the front end face 20a (the medium facing surface 80). The second rear end 24b is located at a greater distance from the front end face 20a (the medium facing surface 80) than is the first rear end 20Ma.

At least part of the heat sink layer 24 may be located between the first imaginary plane P1 and the second imaginary plane P2 defined in relation to the first embodiment. In the present embodiment, in particular, part of the heat sink layer 24 is located between the first imaginary plane P1 and the second imaginary plane P2. The remainder of the heat sink layer 24 is located above the second imaginary plane P2.

In the present embodiment, the heat sink layer 24 has an inclined surface 24c facing toward the medium facing surface 80. The inclined surface 24c has a first end closest to the first portion 21 and a second end farthest from the first portion 21. The inclined surface 24c is inclined with respect to the medium facing surface 80 such that the second end is at a greater distance from the medium facing surface 80 than is the first end. The insulating film 32 lies on the inclined surface 24c. The separating film 34 covers the insulating film 32 and the heat sink layer 24. The main pole 40 lies on the separating film 34.

In the present embodiment, the first metal material used to form the first portion 21 contains one of Rh, Ir, Ru and Pt. The fourth metal material used to form the heat sink layer 24 of the present embodiment is preferably Cu, in particular.

For the configuration where the heat sink 33 is situated on the heat sink layer 24 as in the ninth embodiment, there may be cases where an oxide film to impede heat transfer is formed during the process of formation of the heat sink 33 at a location near the interface between the heat sink layer 24 and the heat sink 33. In such cases, there may be degradation in the heat dissipation performance of the stack composed of the heat sink layer 24 and the heat sink 33.

In the present embodiment, in contrast, the heat sink 33 is not provided because the heat sink layer 24, which constitutes part of the plasmon generator 20, also serves as the heat sink 33 of the ninth embodiment. Thus, the present embodiment eliminates the formation of the aforementioned oxide film, thereby allowing for more effective dissipation of the heat generated by the first portion 21 to the outside of the plasmon generator 20. Further, the present embodiment allows for manufacture of the thermally-assisted magnetic recording head in a reduced number of steps when compared to the configuration where the heat sink 33 is situated on the heat sink layer 24.

In the present embodiment, the first portion 21 may be formed of the first metal material of the second embodiment, i.e., a metal material containing the first metal element and the second metal element. In that case, it becomes possible to make the adhesion between the first portion 21 and the heat sink layer 24 higher, and make the first portion 21 less susceptible to thermal deformation, when compared to the case where the first metal material is composed only of the first metal element.

The remainder of configuration, function and effects of the present embodiment are similar to those of the ninth embodiment.

The present invention is not limited to the foregoing embodiments, and various modifications may be made thereto. For example, as far as the requirements of the appended claims are met, materials employable for the components of the plasmon generator of the present invention are not limited to those illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A plasmon generator having a front end face configured to generate near-field light from a surface plasmon, comprising:
    a first portion formed of a first metal material and including the front end face;
    a second portion formed of a second metal material and located at a distance from the front end face; and
    a first heat sink layer formed of a third metal material, located at a distance from the front end face and interposed between the first portion and the second portion, wherein
    the second metal material is lower in Vickers hardness and higher in thermal conductivity than the first metal material, and
    the third metal material has a thermal conductivity higher than that of each of the first and second metal materials, and has a Vickers hardness lower than that of the first metal material and higher than that of the second metal material.

2. The plasmon generator according to claim 1, wherein the second portion includes a plasmon exciting section configured to excite the surface plasmon thereon.

3. The plasmon generator according to claim 1, wherein the front end face has a first edge and a second edge opposite to each other in a first direction,
    at least part of the first heat sink layer is located between a first imaginary plane and a second imaginary plane,
    the first imaginary plane includes the first edge and is perpendicular to the first direction, and
    the second imaginary plane includes the second edge and is perpendicular to the first direction.

4. The plasmon generator according to claim 1, wherein the first metal material contains one of Rh, Ir, Ru and Pt.

5. The plasmon generator according to claim 4, wherein the first metal material further contains one of Au, Cu, Ag and Al.

6. The plasmon generator according to claim 1, wherein the second metal material is Au, and the third metal material is Cu.

7. The plasmon generator according to claim 1, further comprising a second heat sink layer formed of a fourth metal material, located at a distance from the front end face and being in contact with the first portion,
    wherein the fourth metal material is lower in Vickers hardness and higher in thermal conductivity than the first metal material.

8. The plasmon generator according to claim 7, wherein the front end face has a first edge and a second edge opposite to each other in a first direction,
    at least part of the first heat sink layer and at least part of the second heat sink layer are located between a first imaginary plane and a second imaginary plane,
    the first imaginary plane includes the first edge and is perpendicular to the first direction, and
    the second imaginary plane includes the second edge and is perpendicular to the first direction.

9. The plasmon generator according to claim 7, wherein the fourth metal material is Cu.

10. The plasmon generator according to claim 1, wherein
the second portion has a contact surface in contact with the first heat sink layer,
the first heat sink layer includes a thickness-changing portion, and
in the thickness-changing portion, a thickness in a direction perpendicular to the contact surface decreases with decreasing distance to the front end face.

11. A thermally-assisted magnetic recording head comprising:
a medium facing surface configured to face a recording medium;
a main pole for producing a write magnetic field for use to write data on the recording medium;
a waveguide including a core and a cladding, the core allowing light to propagate therethrough, the cladding being provided around the core; and
the plasmon generator of claim 1,
wherein the front end face of the plasmon generator is located in the medium facing surface.

12. The thermally-assisted magnetic recording head according to claim 11, wherein
the core has an evanescent light generating surface configured to generate evanescent light from the light propagating through the core,
the second portion includes a plasmon exciting section configured to excite the surface plasmon thereon, and
the plasmon generator is configured so that the surface plasmon is excited on the plasmon exciting section through coupling with the evanescent light, and then the surface plasmon propagates to the front end face.

13. The thermally-assisted magnetic recording head according to claim 11, further comprising a heat sink interposed between the plasmon generator and the main pole.

14. The thermally-assisted magnetic recording head according to claim 13, wherein
the heat sink has an inclined surface facing toward the medium facing surface,
the inclined surface has a first end closest to the plasmon generator, and a second end farthest from the plasmon generator,
the inclined surface is inclined with respect to the medium facing surface such that the second end is at a greater distance from the medium facing surface than is the first end, and
the main pole includes a portion located between the inclined surface and the medium facing surface.

15. A plasmon generator having a front end face configured to generate near-field light from a surface plasmon, comprising:
a first portion formed of a first metal material and including the front end face; and
a second portion formed of a second metal material and located at a distance from the front end face, wherein
the second metal material is lower in Vickers hardness and higher in thermal conductivity than the first metal material,
the first metal material contains one of Rh, Ir, Ru and Pt, and
the second metal material is Cu.

16. The plasmon generator according to claim 15, wherein the first metal material further contains one of Au, Cu, Ag and Al.

17. The plasmon generator according to claim 15, further comprising a first heat sink layer formed of Cu, the first heat sink layer being located at a distance from the front end face and interposed between the first portion and the second portion.

18. The plasmon generator according to claim 17, wherein
the front end face has a first edge and a second edge opposite to each other in a first direction,
at least part of the first heat sink layer is located between a first imaginary plane and a second imaginary plane,
the first imaginary plane includes the first edge and is perpendicular to the first direction, and
the second imaginary plane includes the second edge and is perpendicular to the first direction.

19. The plasmon generator according to claim 17, further comprising a second heat sink layer formed of Cu, the second heat sink layer being located at a distance from the front end face and in contact with the first portion.

20. The plasmon generator according to claim 19, wherein
the front end face has a first edge and a second edge opposite to each other in a first direction,
at least part of the first heat sink layer and at least part of the second heat sink layer are located between a first imaginary plane and a second imaginary plane,
the first imaginary plane includes the first edge and is perpendicular to the first direction, and
the second imaginary plane includes the second edge and is perpendicular to the first direction.

21. A thermally-assisted magnetic recording head comprising:
a medium facing surface configured to face a recording medium;
a main pole for producing a write magnetic field for use to write data on the recording medium;
a waveguide including a core and a cladding, the core allowing light to propagate therethrough, the cladding being provided around the core; and
the plasmon generator of claim 15,
wherein the front end face of the plasmon generator is located in the medium facing surface.

22. The thermally-assisted magnetic recording head according to claim 21, wherein
the core has an evanescent light generating surface configured to generate evanescent light from the light propagating through the core,
the second portion includes a plasmon exciting section configured to excite the surface plasmon thereon, and
the plasmon generator is configured so that the surface plasmon is excited on the plasmon exciting section through coupling with the evanescent light, and then the surface plasmon propagates to the front end face.

23. A thermally-assisted magnetic recording head comprising:
a medium facing surface configured to face a recording medium;
a main pole for producing a write magnetic field for use to write data on the recording medium;
a waveguide including a core and a cladding, the core allowing light to propagate therethrough, the cladding being provided around the core;
a plasmon generator having a front end face configured to generate near-field light from a surface plasmon; and
a heat sink interposed between the plasmon generator and the main pole, wherein
the front end face of the plasmon generator is located in the medium facing surface,
the plasmon generator includes a first portion and a heat sink layer, the first portion being formed of a first metal material and including the front end face, the heat sink layer being interposed between the first portion and the heat sink, the heat sink is formed of a metal material that is lower in Vickers hardness and higher in thermal conductivity than the first metal material, and the heat sink layer is formed of a metal material that has a thermal conductivity higher than that of each of the first metal material and the metal material used to form the heat sink, and a Vickers hardness lower than that of the first metal material and higher than that of the metal material used to form the heat sink.

24. The thermally-assisted magnetic recording head according to claim 23, wherein
the first metal material contains one of Rh, Ir, Ru and Pt,
the metal material used to form the heat sink is Au, and
the metal material used to form the heat sink layer is Cu.

25. The thermally-assisted magnetic recording head according to claim 24, wherein the first metal material further contains one of Au, Cu, Ag and Al.

26. A plasmon generator having a front end face configured to generate near-field light from a surface plasmon, comprising:
a main part including the front end face; and
a heat sink layer in contact with the main part, wherein
the main part includes a first portion formed of a first metal material and including the front end face,
the heat sink layer is formed of a second metal material and located at a distance from the front end face,
the main part has a first rear end farthest from the front end face,
the heat sink layer has a second rear end farthest from the front end face,
the second rear end is located at a greater distance from the front end face than is the first rear end,
the second metal material is lower in Vickers hardness and higher in thermal conductivity than the first metal material,
the first metal material contains one of Rh, Ir, Ru and Pt, and
the second metal material is Cu.

27. The plasmon generator according to claim 26, wherein the first metal material further contains one of Au, Cu, Ag and Al.

28. The plasmon generator according to claim 26, wherein
the front end face has a first edge and a second edge opposite to each other in a first direction,
at least part of the heat sink layer is located between a first imaginary plane and a second imaginary plane,
the first imaginary plane includes the first edge and is perpendicular to the first direction, and
the second imaginary plane includes the second edge and is perpendicular to the first direction.

29. A thermally-assisted magnetic recording head comprising:
a medium facing surface configured to face a recording medium;
a main pole for producing a write magnetic field for use to write data on the recording medium;
a waveguide including a core and a cladding, the core allowing light to propagate therethrough, the cladding being provided around the core; and
the plasmon generator of claim 26,
wherein the front end face of the plasmon generator is located in the medium facing surface.

* * * * *